United States Patent [19]

Nicolaidis

[11] Patent Number: 5,450,340
[45] Date of Patent: Sep. 12, 1995

[54] IMPLEMENTATION TECHNIQUES OF SELF-CHECKING ARITHMETIC OPERATORS AND DATA PATHS BASED ON DOUBLE-RAIL AND PARITY CODES

[75] Inventor: Michael Nicolaidis, Athens, Greece

[73] Assignee: Sofia Koloni, Ltd., Athens, Greece

[21] Appl. No.: 167,822

[22] PCT Filed: Apr. 14, 1993

[86] PCT No.: PCT/GR93/00007
§ 371 Date: Dec. 17, 1993
§ 102(e) Date: Dec. 17, 1993

[87] PCT Pub. No.: WO93/21576
PCT Pub. Date: Oct. 28, 1993

[30] Foreign Application Priority Data

Apr. 21, 1992 [GR] Greece .................. 920100163

[51] Int. Cl.⁶ .................... G06F 11/10; G06F 7/49
[52] U.S. Cl. ..................... 364/738; 371/49.4; 371/63
[58] Field of Search ............. 364/738, 737; 371/49.4, 371/63

[56] References Cited

U.S. PATENT DOCUMENTS

| | | | |
|---|---|---|---|
| 3,925,647 | 12/1975 | Louie ................... | 364/738 |
| 4,224,680 | 9/1980 | Miura ................... | 364/738 |
| 4,638,482 | 1/1987 | Griffin et al. .......... | 371/63 |
| 4,924,117 | 5/1990 | Tamaru .................. | 371/63 |
| 4,924,424 | 5/1990 | Vassiliadis ............. | 364/738 |
| 4,958,353 | 9/1990 | Greiner et al. .......... | 371/49.4 |

FOREIGN PATENT DOCUMENTS

| | | |
|---|---|---|
| 824201 | 4/1981 | U.S.S.R. . |
| 1208558 | 1/1986 | U.S.S.R. . |
| 1451677 | 1/1989 | U.S.S.R. . |

OTHER PUBLICATIONS

"Concurrent Error Detection for Group Look-ahead Binary Adders" by G. G. Langdon, Jr. and C. K. Tang, IBM J. Res. Develop, Sep. 1970, pp. 563–573.

"Effect of Byzantine Hardward Faults on Concurrent Error Checking" by Takashi Nanya and Hendrik A. Goosen, 1987 IEEE CH2469–May 1987 pp. 242–245.

"Test Generation for MOS Circuits Using D-Algorithm" by Sunil K. Jain and Vishwani D. Agrawal, 1983 IEEE 0738-100X/83 pp. 64–70.

"Fault Equivalance in Combinational Logic Networks" by Edward J. McCluskey and Frederick W. Clegg, IEEE Transactions on Computers, vol. c-20, No. 11, Nov. 1971, pp. 1286–1293.

"Arithmetic Algorithms for Error-Coded Operands" by Algirdas Avizienis, IEEE Transactions on Computers, vol. c-22, No. 6, Jun. 1973, pp. 567–572.

"Error Secure/Propagating Concept and its Application to the Design of Strongly Fault-Secure Processors" by Takashi Nanya, IEEE Transactions on Computers, vol. 37, No. 1, Jan. 1988, pp. 14–24.

"Strongly Fault-Secure and Strongly Self-Checking Domino–CMOS Implementations of Totally Self--

(List continued on next page.)

Primary Examiner—David H. Malzahn
Attorney, Agent, or Firm—Lowe, Price, Leblanc & Becker

[57] ABSTRACT

A data processing system wherein data are parity encoded for failure checking includes a logic operator generating predetermined signals responsive to input signals via first signal paths including results and carry signals, and a complement generator for generating complements of the predetermined signals responsive to the input signals received through second signal paths which are distinct from the first signal paths. In addition, the data processing system includes a double-rail checker receiving the predetermined signals from the logic operator and the complements from the generating means and for checking the logic operator responsive to the predetermined signals and the compliments and producing an output bit. The data processing system also includes a parity predictor for predicting and generating a parity bit of the results of the logic operator responsive to the output bit of the double-rail checker.

11 Claims, 16 Drawing Sheets

OTHER PUBLICATIONS

"Evaluation of a Self-Checking Version of the MC 68000 Microprocessor" by M. Nicolaidis, 0731-3071/85/0000/0350 1985 IEEE, pp. 350-356.

"On CMOS Totally Self-Checking Circuits" by Sridhar R. Manthani and Sudhakar M. Reddy, 1984 International Test Conference, CHO284-2/0000/0866 1984 IEEE, pp. 866-877.

"On Testable Design for CMOS Logic Circuits" by Sudhakar M. Reddy, Madhukar K. Reddy and Jon G. Kuhl, CH1933-1/83/0000/0435 1983 IEEE, pp. 435-445.

"Shorts in Self-Checking Circuits" by M. Nicolaidis, 1987 International Test Conference, CH2347-2-87/0000/0408 1987 IEEE, pp. 408-417.

"Layout Rules for the Design of Self Checking Circuits" by M. Nicolaidis and B. Courtois, VLSI '85, pp. 261-272.

"Design of NMOS Strongly Fault Secure Circuits Using Undirectional Errors Detecting Codes" by M. Nicolaidis and B. Courtois, 0731-3071/86/0000/0022 1986 IEEE, pp. 22-27.

"Test Pattern Generators for Arithmetic Units and Arithmetic and Logic Units" by M. Nicolaidis.

"An SFS Berger Check Prediction ALU and Its Application to Self-Checking Processor Designs", by Jien-Chung Lo, Suchai Thanawastien, T. R. N. Rao and Michael Nicolaidis, IEEE Transactions on Computer-Aided Design, vol. 11, No. 4, Apr. 1992, pp. 525-540.

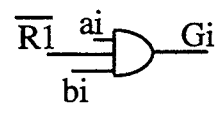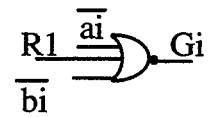
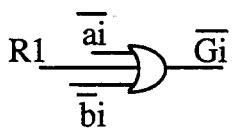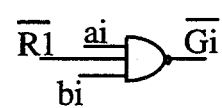
Fig. 10a)          Fig. 10b)
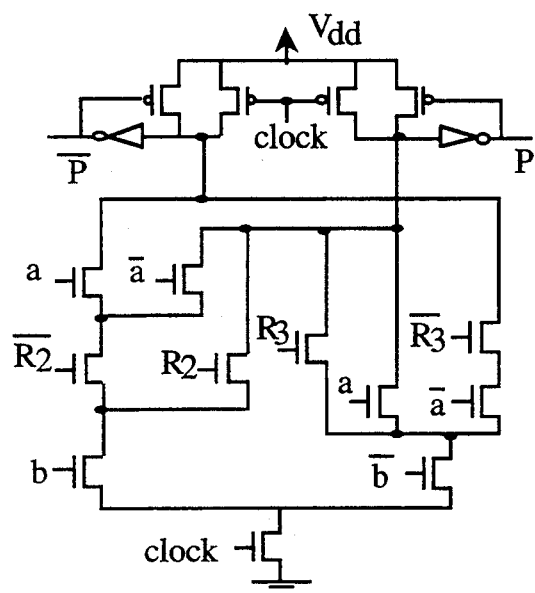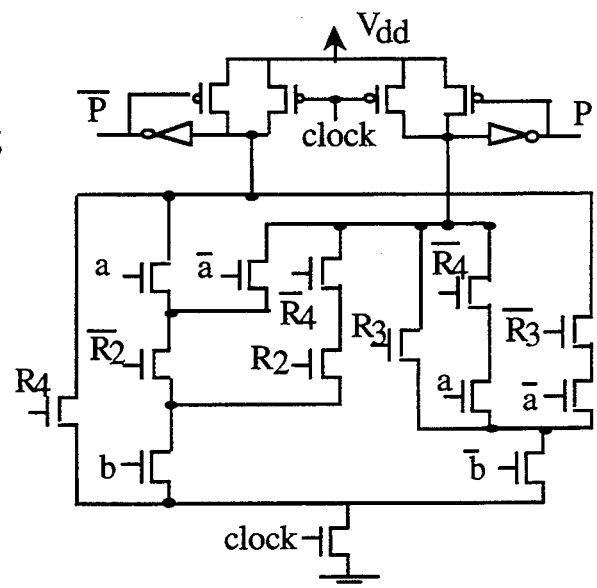
Fig. 11          Fig. 13

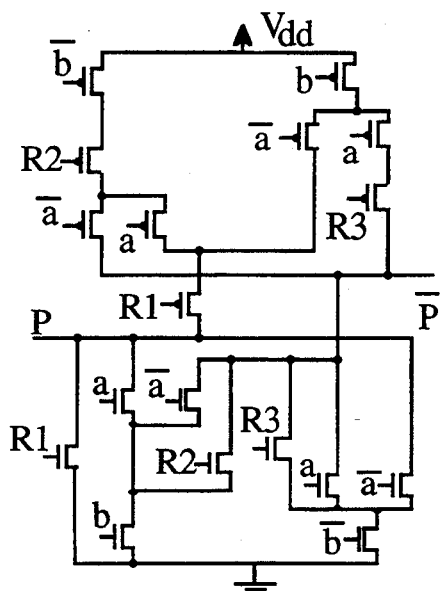
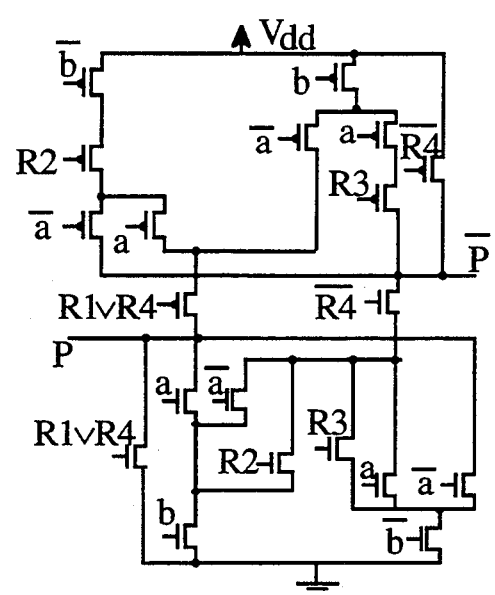
Fig. 20a)  Fig. 20b)
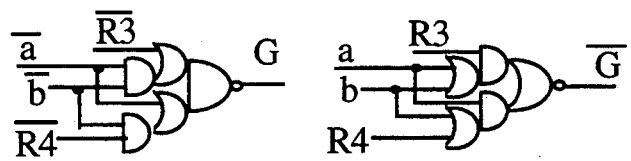
Fig. 20c)
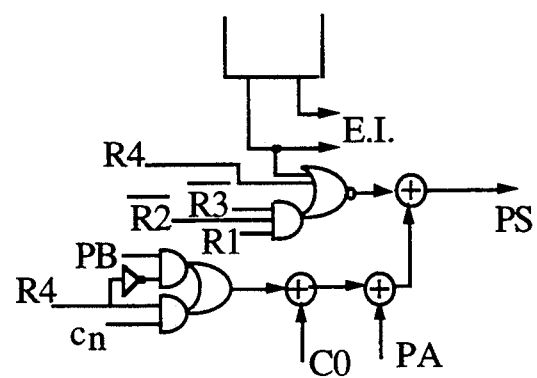
Fig. 22

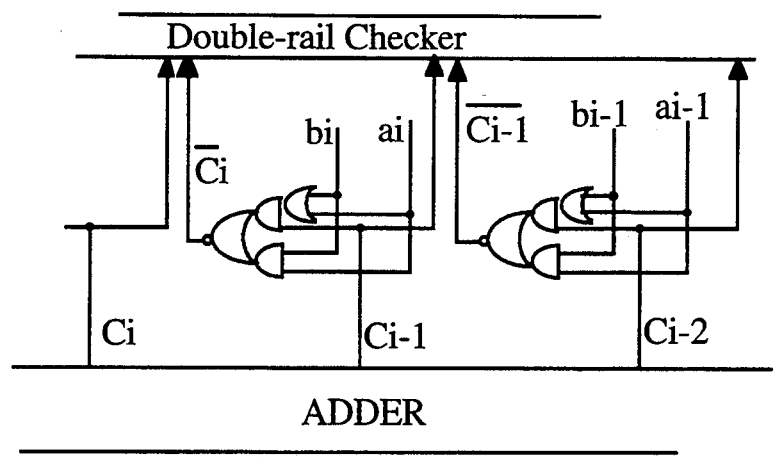
Fig. 25
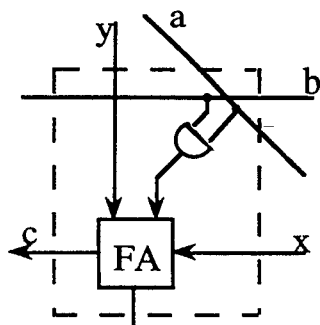　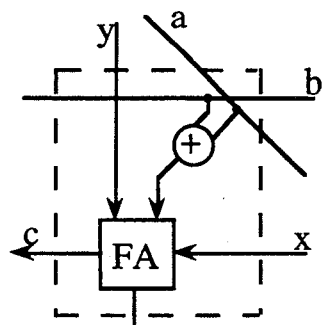
Fig. 26a)　　　Fig. 26b)
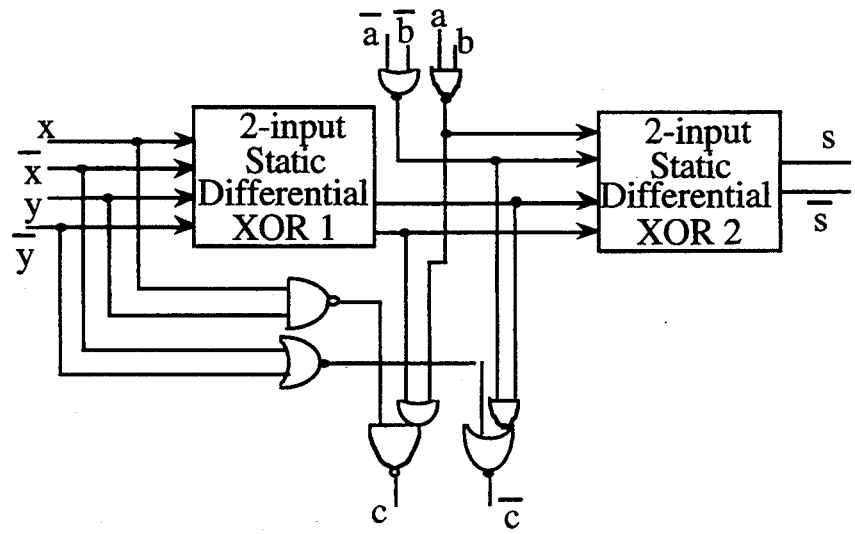
Fig. 27

IMPLEMENTATION TECHNIQUES OF SELF-CHECKING ARITHMETIC OPERATORS AND DATA PATHS BASED ON DOUBLE-RAIL AND PARITY CODES

BACKGROUND OF THE INVENTION

1. Field of the Invention

The invention concerns a technique which allows efficient implementation of self-checking arithmetic operators and data paths.

2. Background of the Related Art

Designing self-checking arithmetic units is a much more complex task than designing self-checking memory systems, register files, and shifters. Since arithmetic units (i.e. adders, ALUs, multipliers and dividers) are an essential element of computers, designing efficient self-checking arithmetic units is an important challenge in the area of self-checking and fault tolerant computers. That is why from the very early developments of fault tolerant computers an important amount of effort has been done on designing self-checking arithmetic units. The first designs are based on arithmetic residue codes (see in "PETERSON W. W. On checking an Adder, IBM J. Res. Develop. 2, pp.166–168, April 1958", in "PETERSON W. W., WELDON E. J., "Error-Correcting Codes", second Ed., The MIT press, Cambridge, Mass., 1972", in "AVIZIENIS A., Arithmetic Algorithms for Error-Coded Operands IEEE Trans. on Comput., Vol. C-22, No. 6, pp.567–572, June 1973"), and have been used in the JPL STAR Computer. Then parity prediction schemes has been given (see in "SELLERS F. F., HSIAO M.-Y. and BEARNSON L. W., Error Detecting Logic for Digital Computers, New-York: Mc GRAW-HILL 1968", and in "GARCIA O. N., RAO T. R. N., On the method of checking logical operations, Proc. 2nd Annual Princeton Conf. Inform. Sci. Sys., pp. 89–95 (1968)"), and more recently a Berger code prediction scheme has been proposed (see in LO J-C., THANAWASTIEN S., RAO T. R. N., NICOLAIDIS M. "An SFS Berger Check Prediction ALU and Its Application to Self-Checking Processors Designs" To appears in IEEE Transactions on CAD of ICAS).

Residue arithmetic codes are interesting for checking the arithmetic units since these codes are closed under arithmetic operations (i.e. if the operands belong to an arithmetic code the results of an arithmetic operation belong to this code too). However, they have the following drawbacks:

arithmetic code checkers are complex circuits, error detection in data path BUSes and Registers can be achieved by using the parity code, but in order to avoid complex code translators they also must be checked by the arithmetic code. This increase the area overhead of the whole data path.

many errors due to single faults can be undetectable in carry lookahead adders checked by arithmetic codes (LANGDON G. G, TANG C. K. "Concurrent error detection for group look-ahead Binary Adders", IBM J. Res.Develop., pp.563–573, September 1970).

logic operations are not closed under arithmetic codes and the use of residue arithmetic codes in ALUs requires complex circuit implementation for residue prediction.

data paths based on residue codes are not compatible neither with self-checking memory systems (parity encoding), nor with fault tolerant memory systems (Hamming SEC/DED).

Parity prediction self-checking arithmetic units (see in "SELLERS F. F., HSIAO M.-Y. and BEARNSON L. W., Error Detecting Logic for Digital Computers, New-York: Mc GRAW-HILL 1968"), and logic units (see in "GARCIA O. N., RAO T. R. N., On the method of checking logical operations, Proc. 2nd Annual Princeton Conf. Inform. Sci. Sys., pp. 89–95 (1968)") have also been proposed. This scheme detects the single errors produced on the outputs of the arithmetic unit. Parity prediction arithmetic units require the lowest hardware overhead among all known self-checking arithmetic unit schemes. This scheme is compatible with parity checked data paths (which requires the minimum hardware overhead) and with parity encoded self-checking memory systems. It also can be modified to be compatible with Hamming SEC/DED memory systems (see "E. FUJIWARA, K. HARUTA Fault-tolerant Arithmetic Logic Unit Using Parity Based Codes. The transactions of the IECE of Japan, Vol E64, No. 10, October 1981". However, a single fault in an arithmetic unit can produce an error on a carry signal which can be propagated to several outputs of the arithmetic unit. Thus the parity scheme does not ensure the fault secure property for single faults.

The self-checking processor (SCP) described in (NANYA T., KAWAMURA T., "Error Secure/Propagation Concept and its Fault Secure Processors" IEEE Trans. on Comput., Vol. 37, No 1, pp. 14–24, January 1988) uses double-rail code for the data bus, the ALU and its associated accumulator and temporary registers. The register file is Berger encoded. Hence the data path requires one two-rail checker, one Berger code checker and two code translators. In order to improve this scheme, "LO J-C., THANAWASTIEN S., RAO T. R. N., NICOLAIDIS M. "An SFS Berger Check Prediction ALU and Its Application to Self-Checking Processors Designs" To appears in IEEE Transactions on CAD of ICAS" proposes to use a Berger code prediction ALU which avoids the use of translators. Thus the whole data path is checked by using a single Berger code checker per BUS. However, the whole data path must be encoded in the Berger code and thus the overhead is increased. Note also that the above schemes are not compatible with parity based self-checking memory systems or with Hamming SEC/DED fault tolerant memory systems.

SUMMARY OF THE INVENTION

From the above discussion it has been discovered that a self-checking arithmetic unit may be defined as optimal if it reaches the following goals:

it is self-checking for all the single faults, it requires a low hardware overhead (if possible lower than the one required by the parity prediction scheme), it is checked by a compact checker, and it can be combined with a parity checked data path without using code translators.

The present invention proposes an implementation which reaches all these goals so that the self-checking arithmetic unit can be said to be optimal.

The proposed adders/ALUs of the present invention combine double-rail and parity codes and allow self-checking implementation for all the known ALU and adder schemes (i.e. ripple-carry, manchester-carry, group carry lookahead, full carry lookahead and carry skip).

Two very efficient and innovative techniques are used. The first technique avoids duplication of the carry lookahead (or the skip carry) block. The other technique combines the new adders/ALUs with data paths checked by the parity code, without using code translators (this technique is also compatible with parity checked memory systems, and it could be extended to the design of fault tolerant data paths being compatible with Hamming SEC/DED memory systems.

The new schemes of the present invention require less hardware overhead than the parity prediction scheme (this last is known to require the lower overhead among all other known schemes). For instance 20% for a 32-bit full carry lookahead adder based on the carry lookahead units (CLU) proposed in "HWANG K., Computer Arithmetic, Principles, Architecture and Design, John Wiley and Sons, New-York, 1979", while the parity prediction adder involves an overhead of 50%. In addtition, the new schemes of the present invention are strongly fault secure or totally self-checking with respect to a comprehensive fault model which includes stuck-at, stuck-on and stuck-open faults, while the parity prediction scheme does not ensure the fault secure property.

The present invention also proposes static CMOS self-checking implementations. It has been considered previously that static CMOS circuits can not be made fault secure with respect to the stuck-on faults. However the proposed schemes of the present invention are fault secure for these faults. This is important since the Domino CMOS circuits can be made SFS but they are very vulnerable to the noise. Thus they are not suitable for many safety critical applications and they are prohibited in space applications (KERNS S. E., SHAFER B. D., ed., "The design of Radiation-Hardened ICs for space: a compendium of approaches" Proc. IEEE, pp. 1470–1509, November 1988). On the other hand the fault secure property for stuck-on faults can be ensured by means of Built-In Current Sensors (BICS) but these circuits may involve some speed degradation. Moreover, in both Domino and static CMOS, some real faults (like non ideal stuck-open faults) can produce undetermined erroneous levels without involving static current dissipation.

Further, by using similar techniques, the present invention proposes efficient self-checking implementations for other arithmetic operators such as multiply and divide arrays.

These, together with other features and advantages of the invention are provided in a data processing system wherein data are parity encoded for failure checking. The data processing system includes a logic operator generating predetermined signals responsive to input signals via first signal paths including results and carry signals, and a complement generator for generating complements of the predetermined signals responsive to the input signals received through second signal paths which are distinct from the first signal paths. In addition, the data processing system includes a double-rail checker receiving the predetermined signals from the logic operator and the complements from the generating means and for checking the logic operator responsive to the predetermined signals and the compliments and producing an output bit. The data processing system also includes a parity predictor for predicting and generating a parity bit of the results of the logic operator responsive to the output bit of the double-rail checker.

BRIEF DESCRIPTION OF THE DRAWINGS

FIGS. 10a)–10b) are circuit diagrams illustrating the domino and static versions of the modified generate gates for logic operations, respectively;

FIG. 11 is a circuit diagram of a DCVS modified propagate gate;

FIG. 13 is a circuit diagram of a DCVS modified propagate gate for an arithmetic and logic unit (ALU) that (excepting the addition) also performs logic and shift-left operations;

FIGS. 20a)–20c) are circuit diagrams illustrating a propagate block for parity prediction in ALUs that (excepting the addition) also perform logic operations, a propagate block for parity prediction in ALUs that (excepting the addition) also perform logic and shift-left operations, and a generate block for parity prediction in ALUs that (excepting the addition) also perform logic and shift-left operations, respectively;

FIG. 22 is a circuit diagram for a parity predictor for an arithmetic logic unit performing logic and shift-left operations;

FIG. 25: is a circuit diagram illustrating a self-checking implementation valid for any adder design;

FIGS. 26a)–26b) are block diagrams illustrating a carry-propagate array multiplier and a non-restoring array divider, respectively; and FIG. 27 is block diagram illustrating a self-checking carry-propagate array multiplier.

DESCRIPTION OF THE PREFERRED EMBODIMENTS OF THE INVENTION

The General Structure of the Self-Checking Data Path

The self-checking adder/ALU will be checked using the double-rail code. All the other blocks of the data path will be checked by the parity code. Using two different codes in the data path requires to use one checker and one code translator for each adder or ALU block, and one checker and one code translator for each BUS. Using translator circuits may involve an important hardware overhead. However this does not occur in the present implementation since the translation from the parity code to the double-rail one can be performed by duplicating ALU input latches and by using normal outputs and complementary outputs of the input latches as in FIG. 1a.

In addition, the following technique also avoids the use of a translator to translate the double-rail code to the parity one.

Specifically, a well known property of double-rail checkers is that they have a one-to-one correspondence with the parity trees see in "ANDERSON D. A., Design of self-checking digital networks using coding techniques. Urbana, CSL/University of Illinois, Sept. 1971 (report n.527)", and in "KHAKBAS J. P. and McCLUSKEY E. J., Self testing embedded parity checkers exhaustive XOR gate testing, Stanford Univ., CRC Rep. 82-10/CSL TN 207, June 1982"). Thus a double-rail checker can be viewed as a differential parity generator; it receives several couples of double-rail inputs and generates a couple of double-rail outputs, which computes the parity of the input couples. By these arguments the parity generator is avoided and the structure of the self-checking data path is as in FIG. 1a. Note that this simple technique has never been used in the past for implementing both double-rail checkers and parity checkers/generators.

Figure 1A:
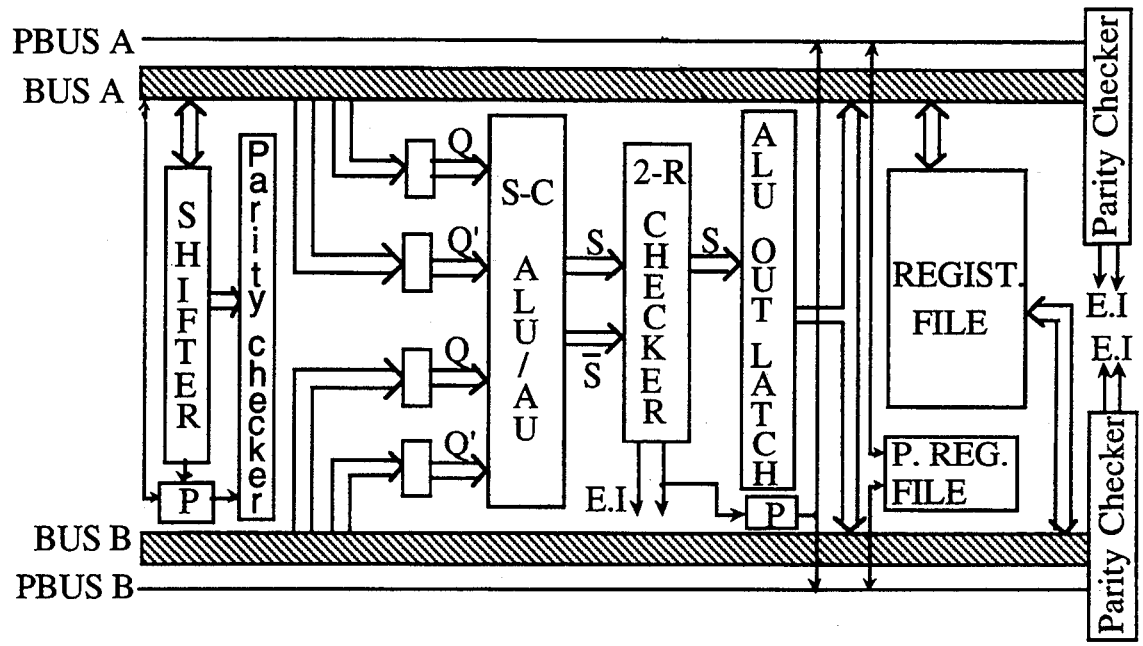
FIGS. 1a)–1c) are block diagrams illustrating the general structure of the self-checking data path.

The self-checking adder/ALU involved in FIG. 1a uses the double-rail code to check the adder/ALU outputs and is called the Output Checking/Parity Generation adder/ALU. This scheme is not efficient for carry lookahead adders since it requires the duplication of the carry lookahead circuitry. Another scheme presented in FIG. 1b uses output checking and parity generation as in the scheme of FIG. 1a. In addition it performs carry checking (that is it checks the carries generated by the carry lookahead block and as shown later it avoids the duplication of the carry lookahead block. This scheme requires the duplication of the input latches (as the scheme of FIG. 1b) and requires a second double-rail checker. The last scheme (presented in FIG. 1c) copes with these drawbacks. In this scheme the output of the carry double-rail checker is combined with some other signals (e.g. the parities of the input data) in order to predict the output parity. The input latches are not duplicated in this scheme. This scheme is very efficient for carry lookahead adders/ALUs but it also implements efficiently the ripple-carry adders/ALUs.

Note that an obvious way to implement the data path of FIG. 1a is to duplicate the adder/ALU (or any other operator). Even for this obvious implementation, the scheme of FIG. 1a has the merit to use the same circuit for both checking the adder/ALU (or the operator) and for generating the parity. This is not the case of implementations proposed previously Self-Checking BUSes and Register Files Before giving the detailed self-checking implementation of the adders we briefly illustrate that the BUSes, the Register File and the Shifter can be checked by the parity code. Single faults generally generate in single errors in the place they occur. In order to ensure that these errors are propagated to the circuit outputs as single errors, researchers (NICOLAIDIS M., COURTOIS B. "Layout rules for the design of self-checking circuits". VLSI Conference, August 85, Tokyo, Japan, pp. 261–272, and NICOLAIDIS M. "Shorts in self-checking circuits" proc. IEEE 1987 Int'l Test conference) have used the following rule:

Rule R1: The divergence degree of any line of the circuit is equal to 1 (here the divergence degree of a line is the number of the circuit outputs with which the line is connected through some paths).

Figure 2:
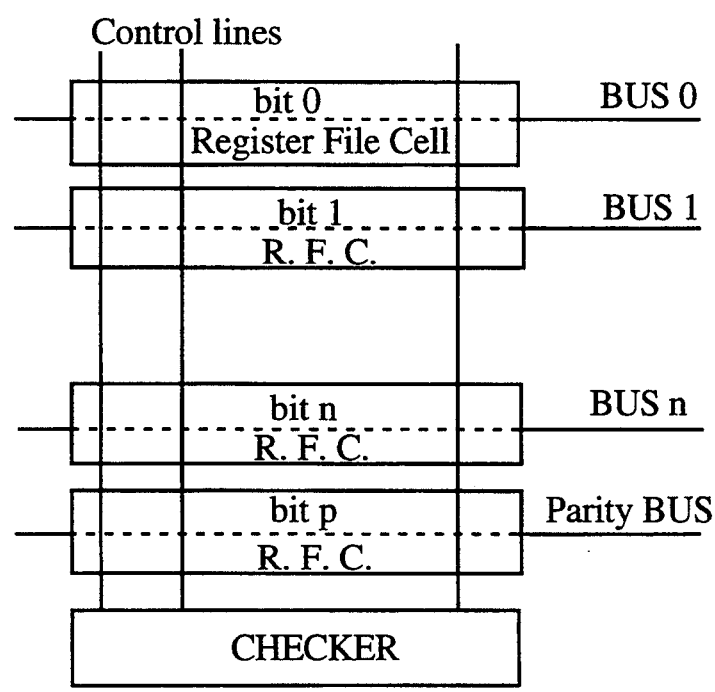
FIG. 2 is a block diagram illustrating the checking of the control signals.

The BUSes and the Register Files have a bit slice structure as presented in FIG. 2. Obviously each line in such a structure respect the rule R1, with the exception of the control lines. Therefore the parity code can be used to check these blocks, provided that the control lines are checked after crossing over the data path. This is shown in FIG. 2 (see also in "NICOLAIDIS M., Shorts in self-checking circuits Journal of Electronic Testing, Theory and Applications (JETTA), No 4, January 1991"). The parity code can also be used to implement an SFS shifter. In FIG. 1a, a parity checker for the shifter and a parity checker for each BUS is needed. The register file is checked when the data is transferred to the BUS. The shifter needs its own checker in order to avoid or prevent a single fault contaminating several cells if several shifts are executed before the transfer of the data from the shifter to the BUS.

Figure 3:
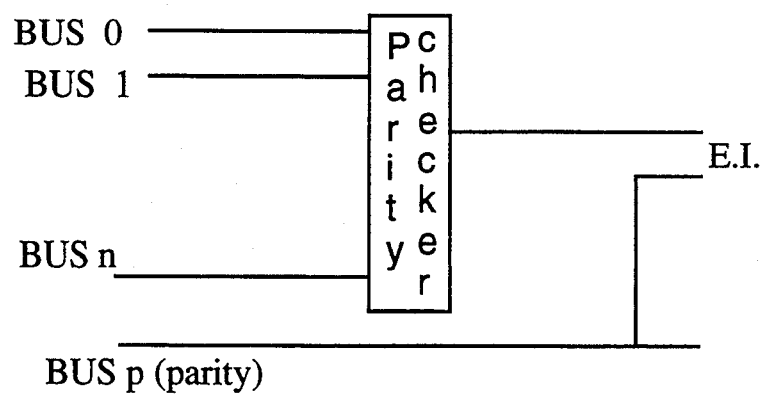
FIG. 3 is a block diagram illustrating a BUS parity checker.

Delays: In the FIG. 1 we can see that the computation of the double-rail checker outputs requires some more delay than the Adder/ALU outputs. Therefore, in order to transfer to the BUS the results of the Adder/ALU and their parity (which is generated by the double-rail checker), the duration of the ALU operation cycle and consequently the duration of the data path cycle must be increased. The following technique minimizes the increase in duration of data path cycle:

the BUS parity checkers are implemented as in FIG. 3.

the results of the Adder/ALU are transferred to the BUS as soon as they are ready (i.e. without taken into account the delay of the parity bit).

the parity bit of the Adder/ALU outputs is transferred to the BUS with a delay equal to D (D is the delay of the double-rail checker). Since the parity and the double-rail checkers have similar delays the scheme of FIG. 3 allows to compensate the two delays.

the parity bit of the BUS is transferred to the registers (or to the shifter) after the transfer of the information bits, with a delay D.

the same delay is used for the transfer of the parity bit from the registers (or the shifter) to the BUS. This technique is similar to the one used in "LO J-C "Self-Checking Reduced Instruction Set Computers"

Ph.D. Dissertation, University of Southern Louisiana, Summmmer 1989".

Generalities on SFS and TSC Domino/DCVS CMOS and Static CMOS Implementations

A comprehensive fault model which includes single line stuck-at faults and single transistor stuck-on and stuck-open faults is described herein. The specific nature or characteristics of stuck-open faults in static CMOS gates is that their detection requires the application of a couple of vectors. The first vector initializes the output of the gate on some appropriate value. The second vector excitates the fault. For this model, introduced in (WADSACK R. L. "Fault modeling and logic simulation of CMOS and MOS integrated circuits" The Bell system technical Journal, May/June 1978, vol. 57, pp.1449–1474), any couple of such vectors allows to detect the fault. More recently some authors consider that due to circuit delays and timing skews in the inputs, the initialization can be invalidated (see in "JAIN S. K., AGRAWAL V. D., Test generation for MOS circuits using D-algorithm" In Proc. Design Automation Conf. Miami Beach, Fla., pp. 64–70, June 1983", and in "REDDY S. M., REDDY N. K., and KUHL J. G., On testable design of CMOS logic circuits in Proc. Int. Test. Conf., Philadelphia, Pa., pp. 435–445, Oct. 1983". Thus specific couples of vectors which can not be affected by such invalidation must be applied. Such test sequences are named robust tests.

The present invention considers or analyzes the model of (WADSACK R. L. "Fault modeling and logic simulation of CMOS and MOS integrated circuits". The Bell system technical Journal, May/June 1978, vol. 57, pp.1449–1474). The specificity of the stuck-on faults in static CMOS gates is that under such faults the gate can behave like a voltage divider, and thus creating undetermined logic values. Due to this behaviour, the design of Domino self-checking circuits is much more convenient than the design of static CMOS models (see in "MANTHANI S. R., REDDY S. M., On CMOS totally Self-checking circuits, In Proc. Int. Test Conf., Philadelphia, Pa., pp. 866–877, Oct. 1984" and in "JHA N. K., Strongly fault-secure and strongly self-checking domino-CMOS implementations of totally self-checking circuits, IEEE Transactions on CAD/ICAS, Vol. 9, No 3, March 1990"). However, a great drawback of Domino logic with respect to the static CMOS logic is that precharged logic like Domino is more vulnerable to the electromagnetic noise and to radiation than the static CMOS logic.

In many systems, the more frequent faults are from transient faults which are due to electromagnetic perturbations. Such perturbations can create multiple transient faults which are not covered by self-checking circuits. Also, the occurrence probability of multiple transient faults increases as the vulnerability to the noise increases and the safety of the system is compromised. Finally, the system availability is quite higher in case of static CMOS. Therefore designing static CMOS self-checking circuits is an important challenge. Thus, in many safety critical applications, precharged logic is prohibited. This is also true for satellite applications due to the vulnerability of precharged logic to radiation (KERNS S. E., SHAFER B. D., ed., "The design of Radiation-Hardened ICs for space: a compendium of approaches" Proc. IEEE, pp. 1470–1509, November 1988). The present invention considers these disadvantanges of prior art models, and proposes self-checking implementations of arithmetic operators in both Domino/DCVS logic and static CMOS logic; the present invention shows how to circumvent some difficult problems involving stuck-on faults in the static CMOS logic as described immediately below.

Fault Secure (generalities): If a fault produces a single error on a internal line of a circuit, then, in order this error to be propagated to the circuit outputs as a unidirectional one (NICOLAIDIS M., COURTOIS B. "Design of self-checking circuits using unidirectional error detecting codes". Proc. 16th Fault Tolerant Computing Symposium, Vienna, Austria, July 1986, pp. 22–27), uses the following rule.

Rule R2: For each line of the circuit, all paths between the line and the circuit outputs have the same inversion parity. The inversion parity of a path p, which passes through a total n inverting couples, is defined to be $IP_{(p)} = n$ modulo 2, so $IP_{(p)} \in \{0,1\}$. When the logical level is considered, inverting couples are the couples input/output of a NOR, a NAND, or a NOT gate (SMITH J. E. METZE G , "Strongly fault secure logic networks" IEEE Trans. on Comp., June 1978).

Inverting couples on the transistor level are also defined (NICOLAIDIS M., COURTOIS B. "Design of self-checking circuits using unidirectional error detecting codes". Proc. 16th Fault Tolerant Computing Symposium, Vienna, Austria, July 1986, pp. 22–27).

Rule R2 requires to check the inversion parities of the paths for all the circuit lines. However the following rule can be shown to be equivalent to the rule R2 so that one just need to check the inversion parities for only the circuit inputs (see in NICOLAIDIS M. "Evaluation of a self-checking version of the MC 68000 Microprocessor". Proc. 15th Fault Tolerant Computing Symposium, Ann Arbor, June 85, pp. 350–356).

Rule R2': For each input of the circuit, all paths between the input and the circuit outputs have the same inversion parity.

The rules R2 and R2' ensure that the errors on the circuit outputs are unidirectional and thus, they are detectable by any unordered code. The double-rail code is an unordered one and thus it can be used to detect these errors. However, it has been observed that the double-rail code is more powerful than other unordered codes; it detects any error such that at least one couple of double-rail outputs take the values 00 or 11. Since the correct values of a double-rail pair are the values 01 or 10, then the present invention realizes that any unidirectional error on such a couple gives the value 00 or 11 and is detectable. Thus, the present invention proposes the following rule.

Rule R3: For each line of the circuit and for each double-rail output couple, all paths between the circuit line and the outputs of the couple have the same inversion parity.

Then the present invention also proposes that the following rule is equivalent to the rule R3.

Rule R3': For each input line and for each output double-rail couple, all paths between the input line and the outputs of the couple have the same inversion parity.

Domino CMOS: One can check easily that a single stuck-at fault produces a single error on the line it occurs. Also a stuck-on or a stuck-open fault produces a single error on the line related to the Drain of the faulty transistor. Moreover the errors produced by the stuck-at and the stuck-open faults are on a logical level. Thus the rules R2 or R2' ensure that the output errors produced by single stuck-at or stuck-open faults are unidirectional (i.e. only of the type 0→1 or only of the type 1→0 at each time). The same fact is true for stuck-on faults in Domino or DCVS p-dominant or n-dominant gates. Note that the above rules cover also the input lines stuck-at faults. Thus using the above rules for implementing the arithmetic operator will result in a fault secure circuit of the present invention.

Static CMOS: Stuck-open faults in static CMOS exhibit a sequential behaviour. However they always generate logic erroneous levels. Thus the fault secure property is guaranteed by the above rules. A problem occurs for the stuck-on faults in static CMOS since they can produce errors on an undetermined level. In the following, we will show that the new schemes of the present invention are fault secure if the faults generate logic erroneous levels (the rules given above will ensure that). However the proposed schemes are also fault secure if the erroneous levels are undetermined. This will be shown in detail below. The self-testing (or the SFS) property for both Domino and static CMOS will also be shown below.

THE OUTPUT CHECKING/PARITY GENERATION ADDERS/ALUs

Output Checking/Parity Generation DCVS ripple-carry adders.

Figure 4A:
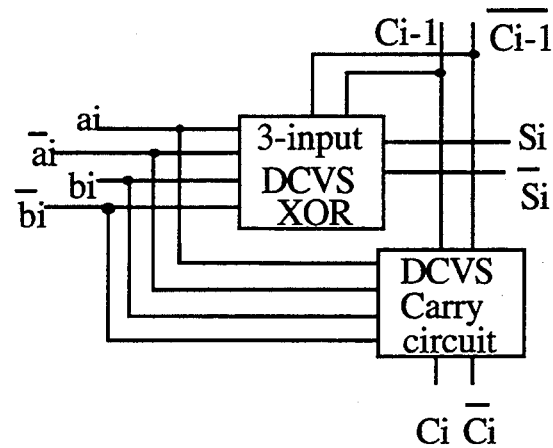
FIGS. 4(a)–4(b) are block diagrams illustrating Differential Cascade Voltage Switch (DCVS) ripple carry adders.
Figure 4B:
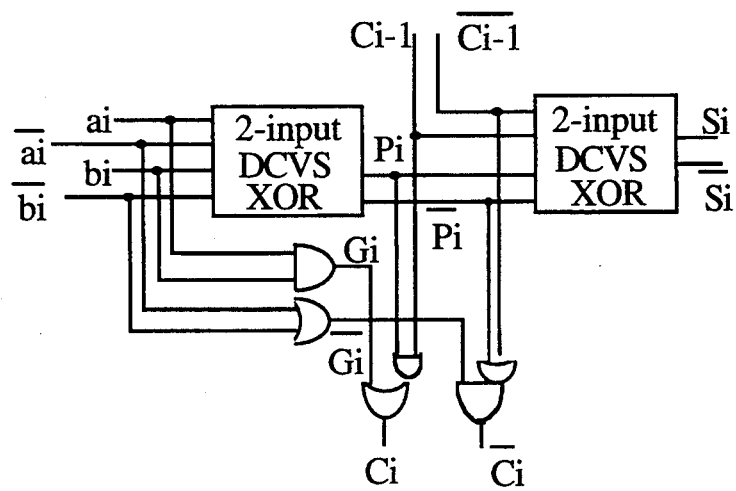
Figure 5A:
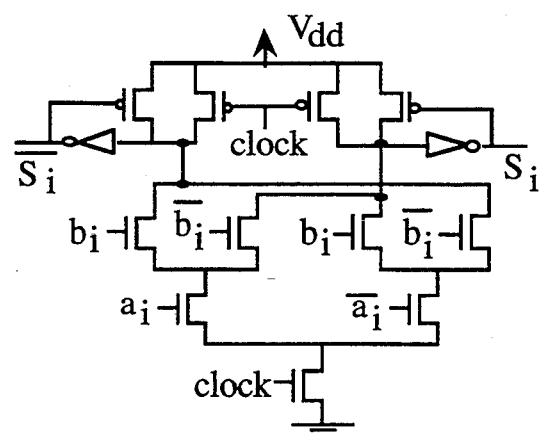
FIGS. 5a)–5c) are circuit diagrams illustrating DCVS logic.
Figures 5B, 5C:
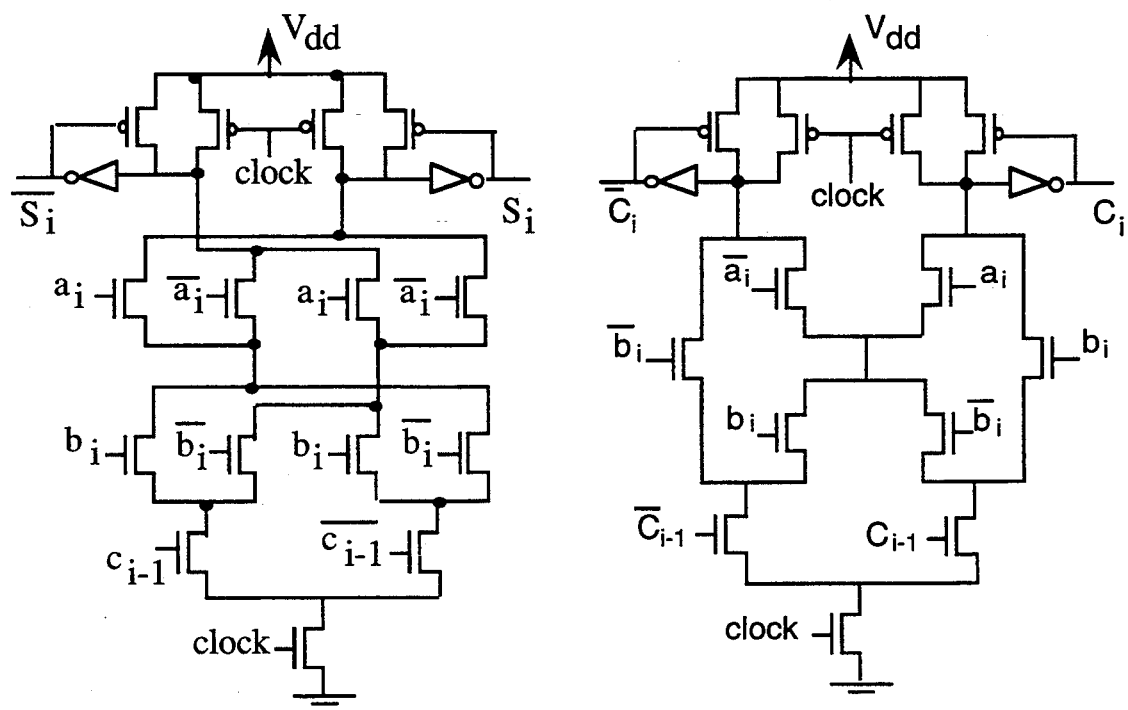

The DCVS implementation of the ripple carry adders is given in FIG. 4a. The DCVS XOR and carry circuits are given in FIG. 5. From "BARZILAI et ad., Accurate Fault modeling and efficient simulation of differential CVS circuits, in Proc. IEEE Int. Test Conf. 1985, pp. 722-729", and from "KANOPOULOS N., VASANTHAVADA N., Testing of Differential Cascade Voltage Switch (DCVS) Circuits, IEEE Journal of Solid-state Circuits, Vol. 25, No 3, June 1990" any DCVS circuit including the DCVS carry adder is fault secure for single stuck-at, stuck-on and stuck-open faults. FIG. 4b gives another ripple carry adder which uses two DCVS XOR gates and some domino gates. Since all these gates are non-inverting, the resulting circuit verifies the rule R2' (and thus the rule R2) and it is fault secure. The design of FIG. 4a needs less transistors than the one of FIG. 4b. Thus it is more interesting for implementing the ripple carry adders. However for manchester carry, carry lookahead and skip carry adders, the propagate and the generate signals are needed. Thus the design of FIG. 4b will be useful.

Output Checking/Parity Generation static CMOS ripple-carry adder.

As explained previously (due to the vulnerability of Domino circuits to the electromagnetic noise and to radiation), the implementation of CMOS static self-checking circuits is a great challenge. In the following we consider self-checking adders implemented in this technology.

Figure 6A:
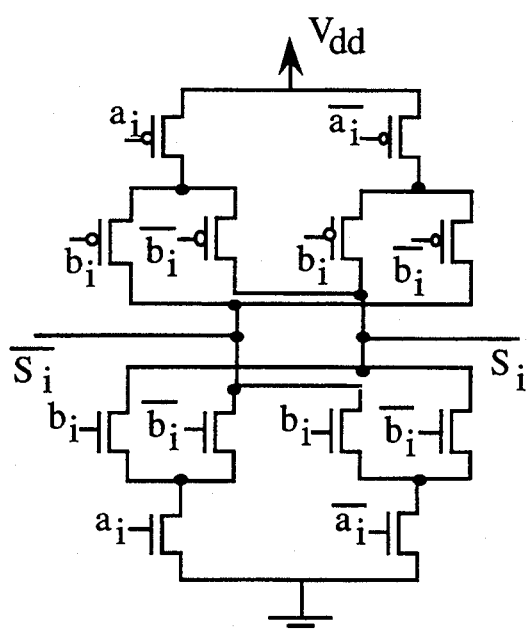
FIGS. 6a)–6b) are circuit diagrams illustrating static differential logic.
Figure 6B:
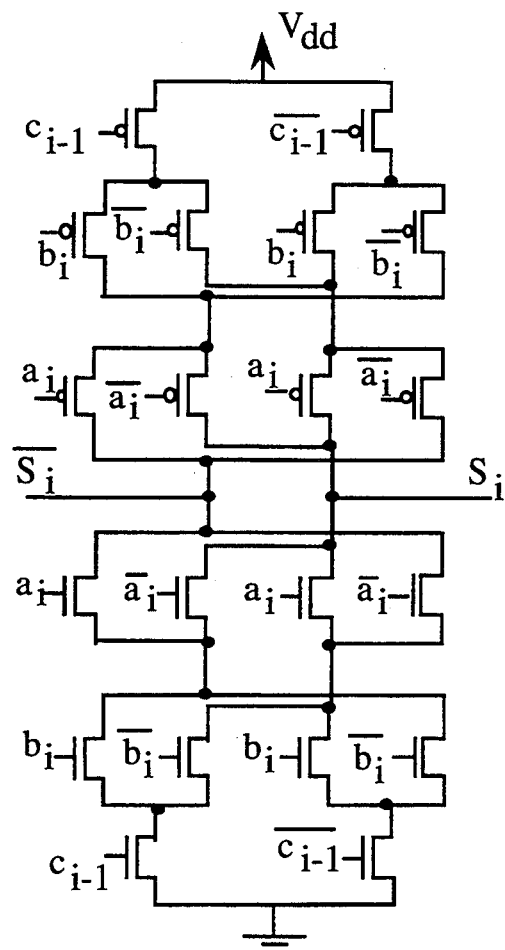
Figure 8:
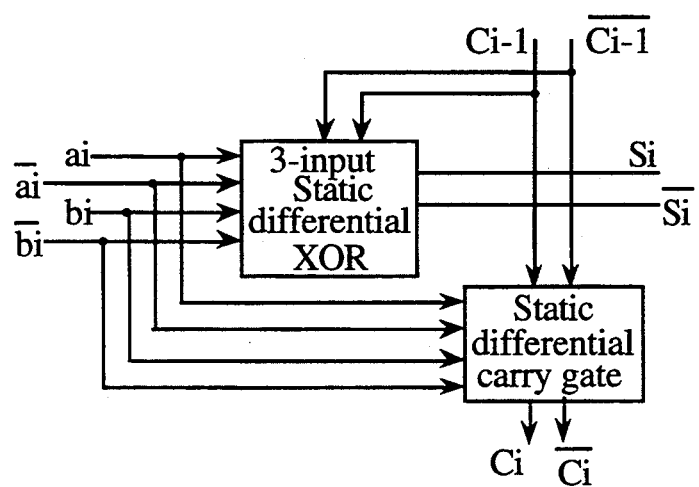
FIG. 8 is a block diagram illustrating a self-checking ripple carry adder.
Figure 7:
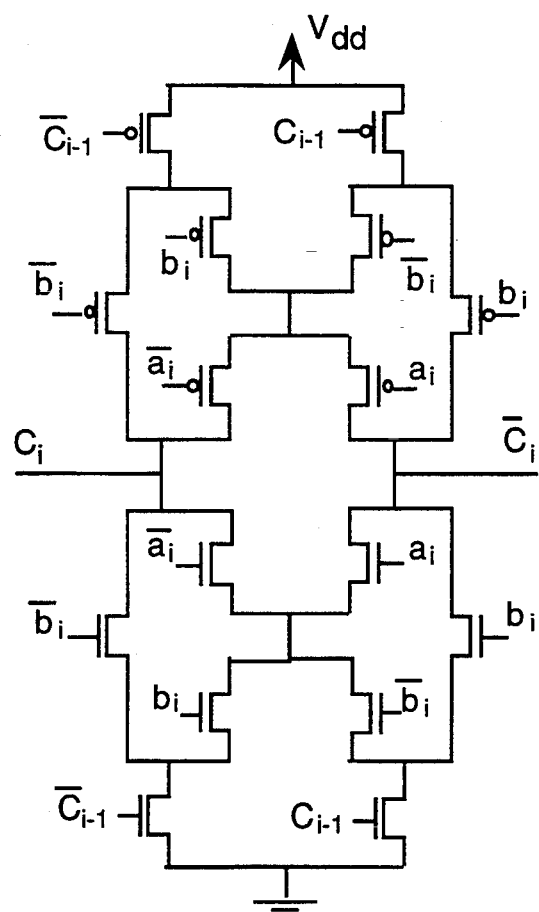
FIG. 7 is a circuit diagram illustrating a static differential carry gate.
Figure 9:
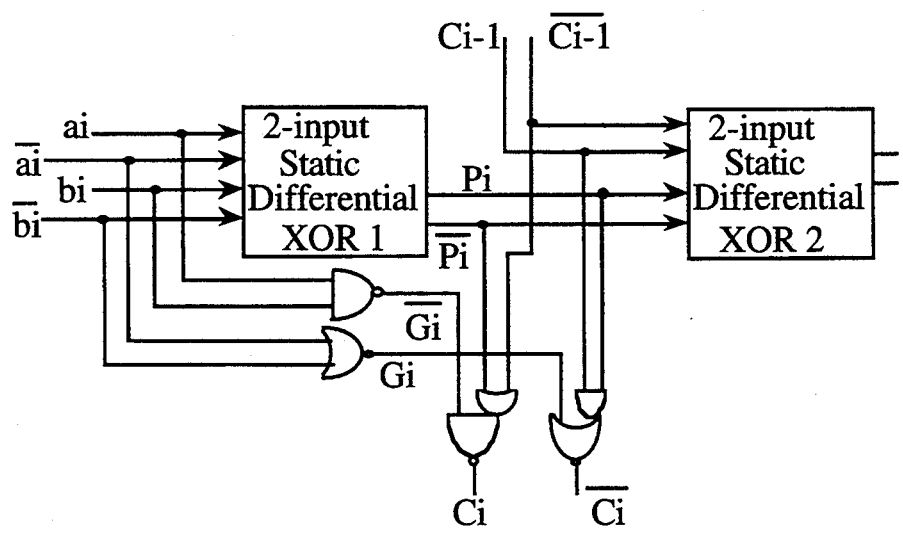
FIG. 9 is a circuit diagram of a static self-checking ripple carry adder.

FIGS. 6 and 7 give some 2-output static gates which receive double-rail inputs and generate double-rail outputs. These gates will be called static differential gates. FIGS. 6a and 6b give respectively the 2-input and 3-input static differential XOR gates. FIG. 7 gives the static differential carry circuit. FIG. 8 gives the one-bit slice of the static self-checking adder which needs 36 transistors. FIG. 9 gives the bit slice of another static self-checking adder which needs more transistors (44), but it is useful for the manchester carry, the carry lookahead and the carry skip adders, since it generates the propagate and generate signals.

Fault Secure Property: The 3-input static differential XOR gate and the static differential carry gate are both inverting. One can easily verify that all paths between $a_i$, $\overline{a_i}$, $b_i$, $\overline{b_i}$ on the one hand and $S_i$, $\overline{S_i}$ have inversion parity equal to 1. Also, the paths between $a_i$, $\overline{a_i}$, $b_i$, $\overline{b_i}$, and $S_{i+k}$, $\overline{S_{i+k}}$ are equal to 0 if k is odd or equal to 1 if k is even. Therefore the rule R3' and thus the rule R3 of the present invention holds. This ensures the fault secure property for all the single stuck-at and stuck-open faults and also for each stuck-on fault which produce logic erroneous levels (a similar analysis is valid for FIG. 9). Q.E.D.

Output Checking/Parity Generation ripple-carry ALUs.

The self-checking ALU can be realized by using the self-checking adder in order to perform the addition operation, and several duplicated (dual) gates in order to perform the logic operations. A multiplexer will select the output signals corresponding to each operation. However, a more compact implementation can be obtained by modifying the propagate and generate blocks in order to perform all the operations by a single circuit.

Figure 12:
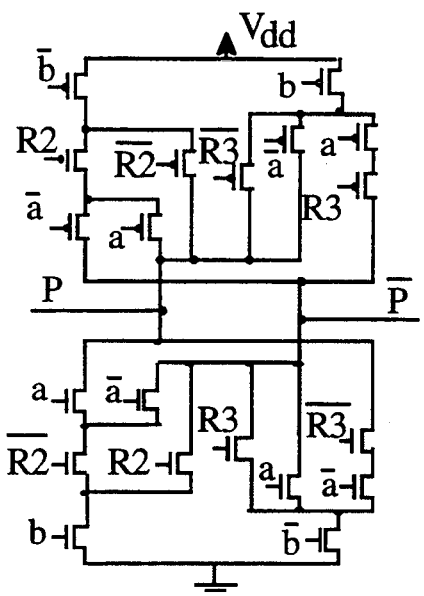
FIG. 12 is a circuit diagram of a static differential modified propagate gate.

The more usual logic operations are the XOR, the AND and the OR. To perform these operations the control line R1 is used as in FIG. 10 to force the carry generate signals $G_i$ to the 0 value. The control signals R2 and R3 modify the function of the propagate block as shown in FIG. 11 and 12, in order to perform the OR or the AND operations. The resulting ALU performs addition for R1=0, R2=0 and R3=0, XOR for R1=1, R2=0 and R3=0, OR for R1=1, R2=1 and R3=0 and NAND for R1=1, R2=0 and R3=1. Finally, one can use a control line to connect to the BUS the complementary outputs of the ALU output latches. Thus the NOR, X-NOR and AND operations are realized. Another control line can be used to invert one of the ALU inputs. This will provide the subtraction and the remaining non trivial logic operations (i.e. $\overline{A}\vee B$, $A\vee \overline{B}$, $\overline{A}\vee \overline{B}$, and $A\vee \overline{B}$). Note that in general the ALUs have an even number of outputs. Since reversing an even number of bits does not change their parity, the parity bit does not need to be reversed.

Figure 14:
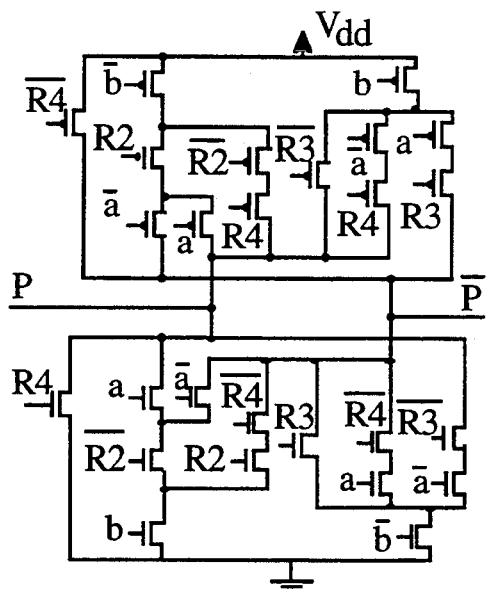
FIG. 14 is a circuit diagram of a static differential modified propagate gate tier an ALU that (excepting the addition) also performs logic and shift-left operations.
Figure 15A:
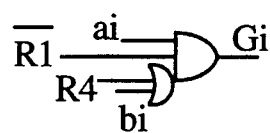
FIGS. 15(a)–15(b) are circuit diagrams illustrating the domino and static versions of the modified generate gate for an ALU that (excepting the addition) also performs logic and shift-left operations, respectively.
Figure 15A:
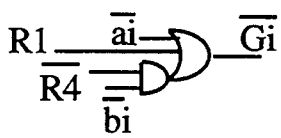
Figure 15B:
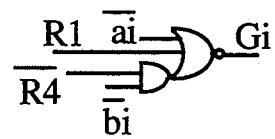
Figure 15B:
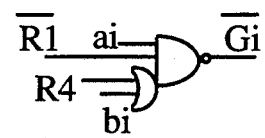

Another operation performed often by ALUs is the shift left. This operation can be performed by using the carries. As shown in FIGS. 13, 14 the values R2=1, R3=0, R4=1 force the signals $P_j$ to 0 in order to block the carry propagation. In FIG. 15 the signal R4 is used to force the signals $G_i$ to the value of $a_i$. Thus $C_i = G_i = a_i$ and $S_{i+1} = C_i \oplus P_{i+1} = a_i$. The ALU obtained by using the circuits of FIG. 13, 14 and 15 performs addition, XOR, OR and NAND as above (in this case R4 is 0). In addition it performs the shift-left for R1=0, R2=1, R3=0, R4=1.

The circuits derived in FIGS. 10, 11, 12, 13, and 14 will be used to replace the propagate and generate blocks in the FIGS. 4b, and 9. Accordingly, the self-checking Domino and static CMOS ALUs are derived using the circuits derived in FIGS. 10–14. The analysis of these circuits is similar to the one given for the self-checking adders.

Carry and Output Checking/Parity GENERATION Scheme

Figure 16:
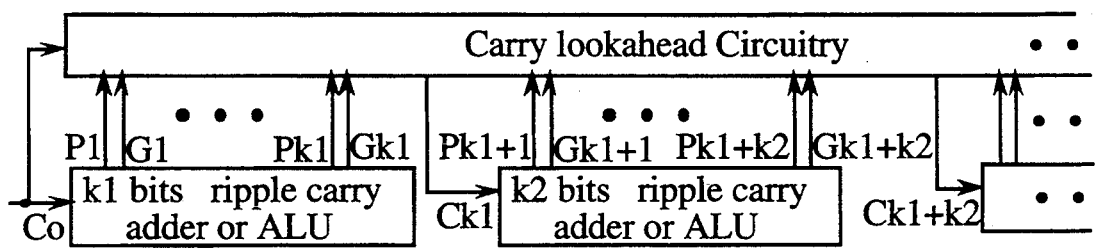
FIG. 16 is a block diagram illustrating a carry lookahead adder.

Ripple carry adders and also Manchester carry adders introduce a great delay so that they can be used for implementing only small adders. In order to implement great adders with acceptable delay one can use a group carry lookahead block. The general structure of a carry lookahead adder or ALU is given in FIG. 16. The carry lookahead can be a group or a full one. In the case of a full carry lookahead each group of slices in FIG. 16 is reduced to a single slice.

In a group carry lookahead adder/ALU each group of slices is implemented as a ripple carry adder/ALU. In the self-checking implementation these groups will be implemented using the double-rail code described previously. In order to combine the self-checking ripple-carry groups with a carry lookahead circuitry, one can implement a second carry lookahead circuitry have as inputs the signals $\overline{P1}, \overline{G1}, \overline{P2}, \overline{G2} \ldots$ of FIG. 4b or of FIG. 9, and generating as outputs the complementary carries $\overline{Ck1}, \overline{Ck1+k2}, \ldots$ Since the carry lookahead circuitry of FIG. 16 implements a monotone function, its dual one will too. Then, both the direct and the dual carry lookahead circuits are non inverting blocks and can be combined with the circuits of FIG. 4b or 9 without invalidating the rule R2 (FIG. 4b) or the rule R3 (FIG. 9).

However as the carry lookahead circuit is a complex circuit, using a dual one will increase significantly the area overhead. In order to cope with this problem the Carry and Output Checking/Parity Generation scheme of FIG. 1b may be combined or used. All the carries generated by the carry lookahead block (full or group), will be checked. The way this checking is given without duplicating the carry lookahead block is presented in FIG. 17. Let us consider a group of slices, for instance the slices 1, 2, ... k1 in FIG. 17. Each slice i receives two double-rail carry inputs $Ci-1, \overline{Ci-1}$ (generated by the previous slice $i-1$), and generates two double-rail carries $Ci, \overline{Ci}$. But the last slice of the group (e.g. the slice k1) generates only the carry Ck1. The carry lookahead circuit generates also a second carry Ck1. These two signals are compared by the carry double-rail checker as in FIG. 17. Then, both the carry inputs Ck1, $\overline{Ck1}$ of the slice k1+1 (first slice of the next group) comes from the output Ck1 of the carry lookahead circuit.

Figure 1B:
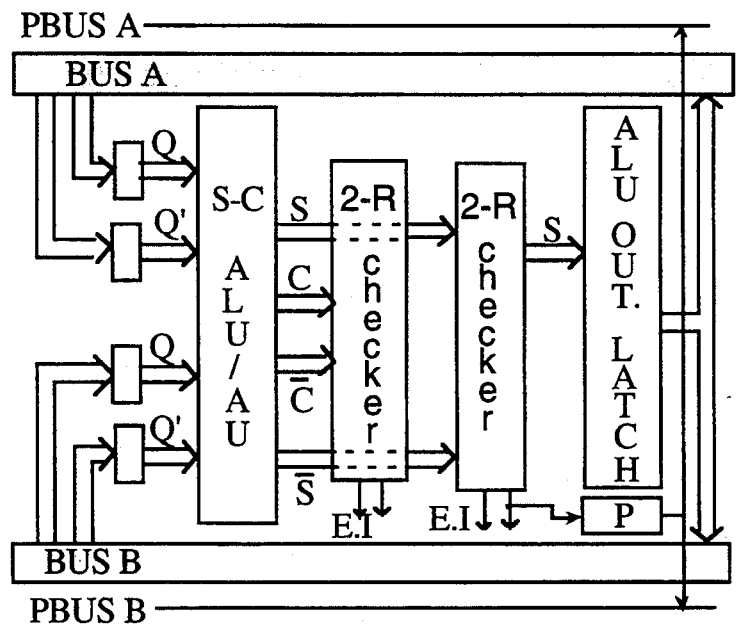

The outputs Si, $\overline{Si}$ are checked by a double-rail checker, this checker also generates the parity of the outputs (as in FIG. 1b). This checker is not shown in FIG. 17. The carry lookahead circuit can be implemented in Domino logic (if for instance it is combined with the Domino self-checking adder slice of FIG. 4b), or in static CMOS (for instance if it is combined with the static self-checking adder slice of FIG. 9).

Fault Secure Property: Let us consider the faults giving logical erroneous levels.

1. The fault affects the bit slice i of a group. For simplicity consider that this slice belongs to the first group in FIG. 17 (i.e. $i \in \{1,2,\ldots,k_1\}$).

1.a: $i \in \{1,2,\ldots,k_1-1\}$

If due to the fault an error on Si, $\overline{Si}$ occurs, then as shown in the previous sections this error is detectable. If the fault produces an error on Ci, $\overline{Ci}$, this error can be propagated to the carries of the higher order slices $i+1$, $i+2$ ... An error on a carry couple Cj, $\overline{Cj}$ is always propagated to the outputs Sj, $\overline{Sj}$ by the differential XOR gate generating these outputs. By the previous sections these output errors are detectable. So either the fault is detected or there is not error propagation to the higher order slices and the carry output Ck1 of the slice k1 is correct. Thus the case that all the outputs S1, $\overline{S1}$ S2, $\overline{S2}$, Sk1,$\overline{Sk1}$ and Ck1, of the group are correct must be considered. If the fault produces an error on the inputs of the carry lookahead circuit (i.e. on the inputs Gi or Pi), the output Ck1 of this circuit can be erroneous. Since the output Ck1 of the slice k1 is correct, the error is detected by the double-rail checker of the carries.

1.b: $i = k1$.

Figure 18A:
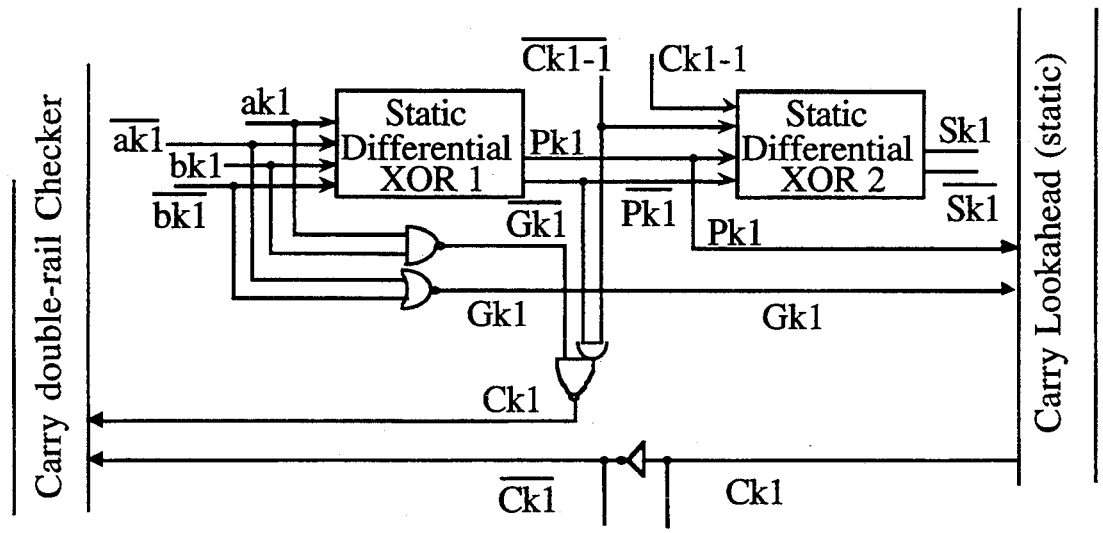
FIGS. 18(a)–18(b) are circuit diagrams illustrating a self-checking full carry lookahead scheme in static and domino logic, respectively.
Figure 18B:
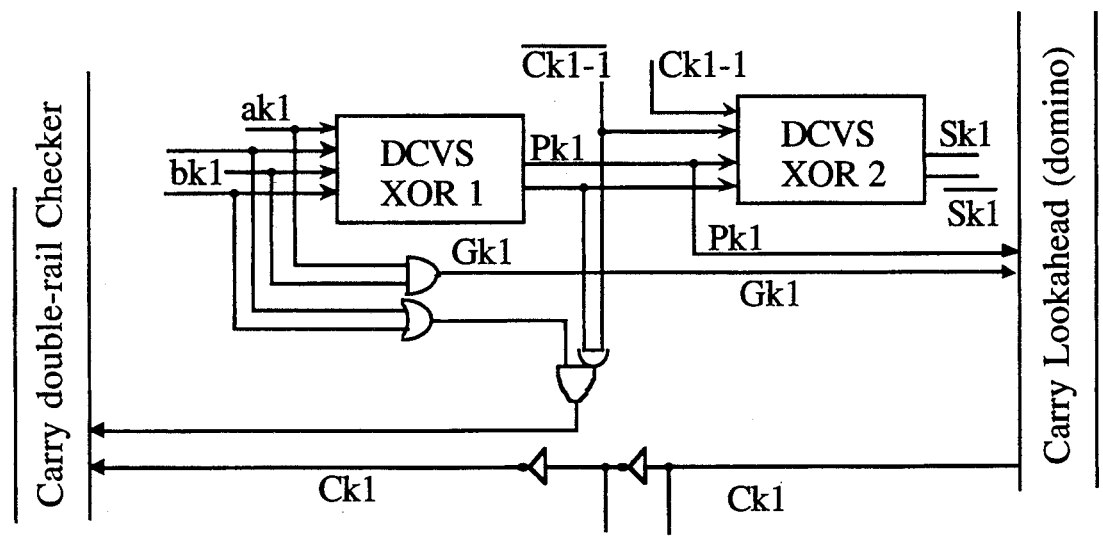

The slice k1 corresponding to the static design of FIG. 9 is implemented as in FIG. 18a. The FIG. 18b gives the slice k1 for the Domino adder of FIG. 4b. Consider FIG. 18a (the proof is similar for the FIG. 18b).

If the fault affects the XOR 2 gate, the errors can affect only the outputs Sk1, $\overline{Sk1}$ and are covered as previously.

If the fault affects the XOR 1 gate, then, as we have seen in the previous sections the errors can affect either $\overline{Pk1}$ or Pk1. In the first case the output Ck1 of the adder slice can be erroneous, but the output Ck1 of the carry lookahead is correct. In the second case the output Ck1 of the adder slice is correct and the output Ck1 of the carry lookahead circuit can be erroneous. In both cases the error will be detected by the carry double-rail checker. On the other hand the fault on the XOR 1 can provoke errors on Sk1, $\overline{Sk1}$. These errors are detected by the double-rail checker of the outputs.

If the fault affects the gate generating $\overline{Gk1}$, or the one generating Ck1 (the error will affect only the output Ck1 of the slice k1), the carry double-rail checker will detect the errors. Finally the fault may affect the gate generating Gk1. In this case the analysis given below in point 2 for faults affecting the carry lookahead block can be easily shown to be valid for this fault.

2. The fault affects the carry lookahead block. Then several outputs of this block can be erroneous at a time. Let Cki be the lower order erroneous output. Since the adder slices are fault free and all the outputs of the carry lookahead block of order lower than ki are correct, then, the output Cki of the slice ki is correct. Therefore the fault is detected by the carry double-rail checker.

The proof is also valid for full carry lookahead adders. In this case the analysis of the point 1a is not required Q.E.D.

Figure 17:
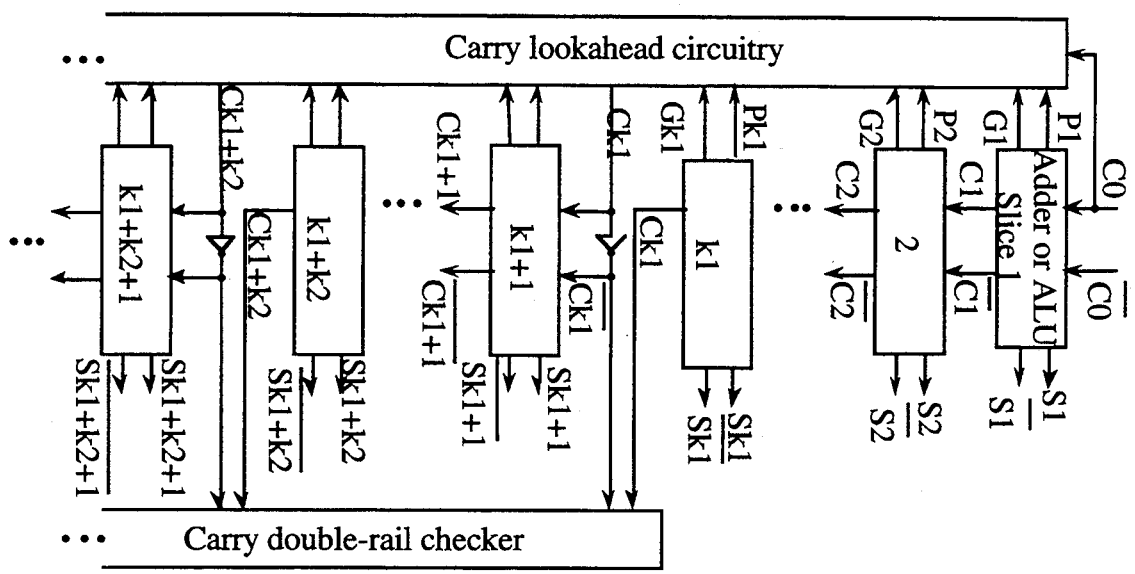
FIG. 17 is a block diagram illustrating a self-checking carry lookahead adder.

Delays: In FIG. 17 the redundant (check) carries Ck1, Ck1+k2, ... are generated using the ripple-carry principle while the normal carries are generated by the carry lookahead circuit. However we can see that using the ripple-carry principle for the redundant (check) carries, will not involve supplementary delays. At first these signals do not involve supplementary delay to the adder operation since these signals are not used for generating the adder outputs. But these signals are compared against the outputs of the carry lookahead block and if they involve great delays they can reduce considerably the speed of the system. However, these signals have the same delays as the outputs of the adder. Thus, they will be ready for comparison as soon as the outputs of the adder are ready. Thus the solution of the FIG. 17 does not compromise the speed of the self-checking adder. What can be critical is the delay of the outputs double-rail checker since it generates the parity to be injected in the BUS (FIG. 1b). This problem has already be discussed in the section concerning the general stucture of the self-checking data path.

Carry Checking/Parity Prediction SCHEME.
Carry Checking/Parity Prediction Adders The Carry and Output Checking/Parity Generation scheme requires to duplicate the input registers and uses two double-rail checkers. The Carry Checking/Parity Prediction scheme given in FIG. 1c allows to cope with these drawbacks. The FIG. 19 implements this scheme for a domino full carry lookahead adder. The carries generated by the carry lookahead block are checked against some redundant carries (called check carries). The implementation is similar for static full carry lookahead adders.

Figure 19:
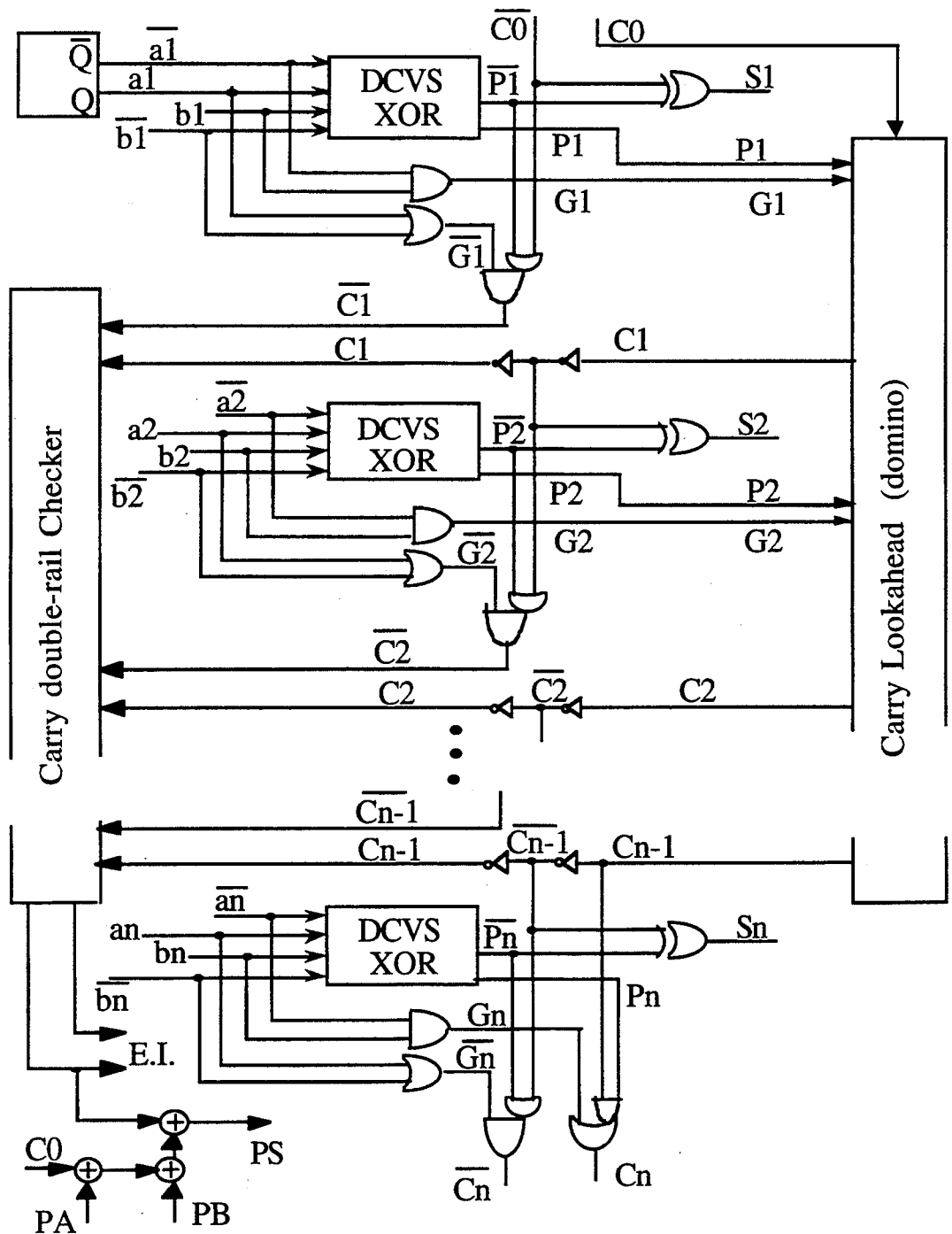
FIG. 19 is a circuit diagram illustrating the Carry Checking/Parity Prediction scheme for a domino full carry lookahead adder.

The parity prediction of the FIG. 19 is based on the fact that for each output Si we have $Si = ai \oplus bi \oplus ci-1$. Thus $PS = S1 \oplus S2 \oplus \ldots \oplus Sn = a1 \oplus a2 \oplus \ldots \oplus an \oplus b1 \oplus b2 \oplus \ldots \oplus bn \oplus c0 \oplus c1 \oplus \ldots \oplus cn-1 = PA \oplus PB \oplus PC$ (C being the carry vector c0, c1, ..., cn−1). This is a well known relationship and has been used in the past for implementing parity prediction self-checking adders (see for instance SELLERS F. F., HSIAO M.-Y. and BEARNSON L. W., "Error Detecting Logic for Digital Computers", New York: Mc GRAW-HILL 1968). We have seen that the double-rail checker generates the parity of its inputs. On the other hand the parities PA and PB of the input data are available in the data path BUSes (FIG. 1). Thus the signal PS in FIG. 19 predicts the parity of the adder outputs. The outputs S1, S2, ..., Sn and their parity PS are checked by the parity checkers of the data path BUSes as in FIG. 1.

In FIG. 19 both the inputs ai, $\overline{ai}$ (and so the inputs bi, $\overline{bi}$) come from a single latch cell and the input latches duplication is avoided. As we will see below, this is due to the parity prediction which allows to detect the error produced by the faults affecting these latches.

Fault Secure property: Let us consider the scheme of FIG. 19.

1. The fault affects an output XOR gate. In this case we have a single error on the adder outputs and no errors on the carries. This error is detected by the parity checker of the BUS.
2. The fault affects the DCVS differential XOR gate. This gate verifies the rule R2. Thus the errors on Pi, $\overline{Pi}$ are unidirectional and thus they may affect either Pi or $\overline{Pi}$ at a time.
   2.a. The error affects $\overline{Pi}$. This errors is propagated to Si (XOR gate). Since Pi is correct the carry lookahead receives correct inputs and thus its output Ci is correct. Thus if the error on $\overline{Pi}$ is propagated to $\overline{Ci}$, the error is detected by the double-rail checker. If it is not propagated to $\overline{Ci}$ then it is not detected by this checker but this error can modify only one output Si of the adder. Thus all the carries are correct and the output Si can be erroneous. The error is detected by the parity checker of the BUS.
   2.b. The error affects Pi.
3. The fault affects the gate generating Gi.
4. The fault affects the carry lookahead block. The error detection for the cases 2.b, 3 and 4 can be proven as in the point 2 of the proof of the fault secure property for the Carry and Output Checking/Parity Generation scheme.
5. The fault affects the gate generating Gi or $\overline{Ci}$. The error can affect only the signal $\overline{Ci}$ and is detected by the double rail checker.
6. The fault affects the input register A or the input register B. A single cell is faulty (single fault model). Let for instance the faulty cell be the cell i of the register A. Since this cell generates both the signals ai and $\overline{ai}$ (see for instance the generation of a1 and $\overline{a1}$ in FIG. 19), then the error may affect either ai, or $\overline{ai}$, or both. The first two cases are covered by the analysis given above. The case both ai and $\overline{ai}$ are erroneous is equivalent to the case the operand A has a single error. Therefore the parity PA' of the erroneous operand A' is different than the parity PA of the correct operand. The self checking adder receives the inputs A', B and and generates the output vector S' and the carry vector C'. Let PS' and PC' be the parities corresponding to these vectors, and let PB be the parity of B. The predicted parity will be $PS'' = PA \oplus PB \oplus PC'$, while the parity of S' is $PS' = PA' \oplus PB \oplus PC'$. Since $PA \neq PA'$ then $PS' \neq PS''$ and the error is detected. Q.E.D.

Note finally that the Carry Checking/Parity Prediction scheme can also be used for implementing ripple-carry adders and group carry lookahead adders. For ripple-carry adders a single output XOR gate for generating each output Si (as in the scheme of FIG. 19) and a differential gate in order to generated the signals Pi, $\overline{Pi}$ are used. In addition, use dual gates are used in order to generate the signals Gi, $\overline{Gi}$ and Ci, $\overline{Ci}$ (as in FIGS. 4b and 9). These gates will implement two dual ripple-carry chains. All the outputs Ci, $\overline{Ci}$ of these chains are checked by a double-rail checker and the parity is predicted as in FIG. 19.

For group carry lookahead adders the Carry Checking/Parity Prediction technique used for the full carry lookahead is merged with the one used for the ripple carry adders. For each slice dual carry signals Ci, $\overline{Ci}$ are generated as following: For the carries generated by the group carry lookahead circuitry the dual signals are generated as for the full carry lookahead case (FIG. 19). For the internal carries of the groups of ripple-carry slices the dual signals are generated as for the ripple-carry adders. A double-rail checker checks all the carries. The parity prediction is as in FIG. 19.

Carry Checking/Parity Prediction ALUS

For full carry lookahead ALUs, the scheme of FIG. 19 must be modified since during the logic operations the equation $PS = PA \oplus PB \oplus PC$ does not hold. The new relationships are known from the literature (e.g. see in GARCIA O. N., RAO T. R. N., "On the method of checking logical operations", Proc. 2nd Annual Princeton Conf. Inform. Sci. Sys., pp. 89–95 (1968)). For instance the relationships $PS = PA \oplus PB$, $PS = PA \oplus PB \oplus P(A\ B)$ and $PS = PA \oplus PB \oplus P(A \vee B)$ must be used for the parity prediction of the XOR function, the OR function and the AND function respectively. These relationships may involve a significant hardware complexity. For instance the computation of $P(A \vee B)$ and $P(A \vee B)$ requires to use n two-input AND, n two-input OR gates, n MUX cells and a parity tree, resulting to a supplementary overhead of 28 transistor per ALU cell (in static CMOS). In order to reduce this hardware the present invention modifies the propagate and generate blocks so that during the logic operations the carry signals compute the functions required for parity prediction and the carry double-rail checker computes the parity of these functions. A self-checking implementation of the ALU performing addition, XOR, OR and NAND is given in FIG. 21. Its propagate block (static) can be implemented as in FIG. 20a. The generate blocks can be found in FIG. 21.

Logic functions computation: During the logic operations the output $\overline{Pi}$ of the FIG. 20a computes the required logic functions as in FIG. 12, but the carry $\overline{Ci} - 1$ can be different than 1. Thus a NOR gate is added to each slice and the signal R1 is used to force (during the logic operations) the signal Si to be equal to the inverse of $\overline{Pi}$.

Figure 21:
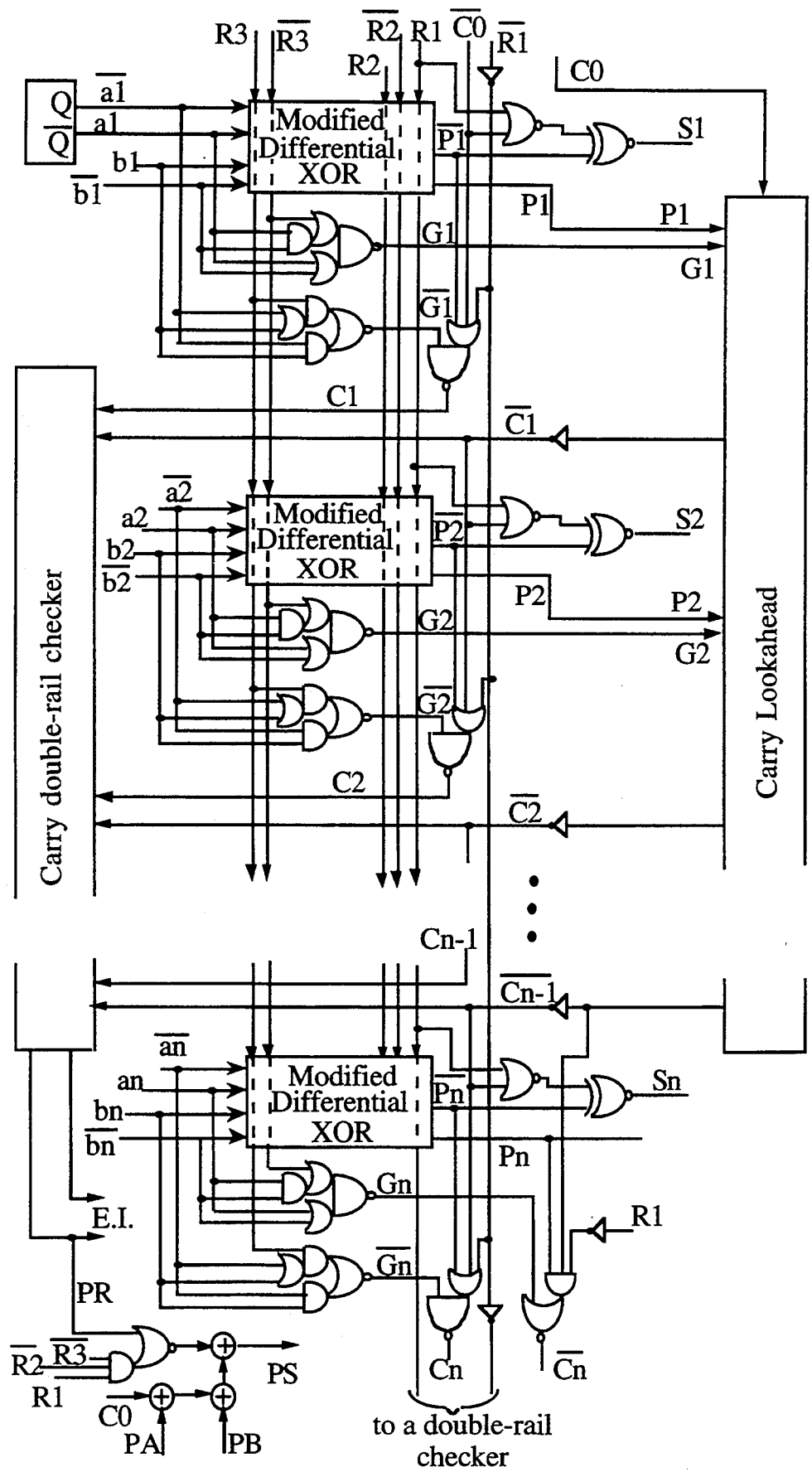
FIG. 21 is a circuit diagram of a full carry lookahead self-checking ALU.

Parity prediction: During the logic operations (R1 = 1) the signals Pi are forced to 0 (FIG. 20a). Thus the carries generated by the carry lookahead circuit are equal to Gi. The signals $\overline{Pi}$ can not be forced to 1 since they compute the inverse of the output function Si. Since $\overline{Pi}\neq 1$ the signal $\overline{R1}$ is used to force the value of the check carries to be equal to the inverse of $\overline{G}$ (see FIG. 21). In FIG. 21 one can find the generate block and its dual. For R3=0 Gi=ai$\wedge$bi, and for R3=1 (this value occurs only during the NAND operation) Gi=ai$\vee$bi. With this implementation, the signal PS predicts the parity of the ALU outputs for the OR and NAND functions (during the logic functions we have co=0). During the XOR function the carries can have values different than 0. Thus in order to have PS=PA$\oplus$PB we use a gate with inputs R1, $\overline{R2}$, and $\overline{R3}$ is used to force to 0 the output PR of the double-rail checker (see FIG. 21).

Since for the NAND function the carries are equal to Gi=ai bi, the scheme is valid for ALUs having an even number of slices (which is the more usual case). If the ALU has an odd number of slices the parity predicted in FIG. 21 must be inversed during the NAND function. Note that the two-output gate of FIG. 20a is not differential since during the logic operations, the outputs Pi and $\overline{Pi}$ do not take complementary values. Note finally that as for the scheme of FIG. 19 the input registers do not need to be duplicated. This is illustrated in FIG. 21 for the bit a.

Fault secure property: The circuit of FIG. 21 has a structure similar to the one of FIG. 19. Again six faults types can be distinguished (as for FIG. 19) and the same arguments can be used. A difference with the structure of the circuit of FIG. 19 consists on the use of the signal R1=1 in order to force the outputs Si to be equal to the inverse of the signals $\overline{Pi}$. A fault affecting the signal R1 can produce multiple output errors which are not detected neither by the carry double-rail checker nor by the parity prediction. In order to cope with this problem the signals R1 and $\overline{R1}$ are checked by a double-rail checker as indicated in FIG. 21. This can be given by using a double-rail checker cell which receives as inputs the signals R1 and and the outputs of the carry double-rail checker. Q.E.D.

The self-checking ALU performing addition, shift-left, XOR, OR, and NAND functions can be implemented similarly by using the propagate block of FIG. 20b and the generate block of FIG. 20c. In that case the parity prediction is performed as shown in FIG. 22.

OTHER FAST CARRY PROPAGATION SCHEMES

The proposed self-checking implementations for carry lookahead adders and ALUs can be extended easily to other fast adder and ALU schemes, like the skip carry and the conditional sum schemes.

Skip carry adders/ALUs

Another technique allowing fast carry propagation is the skip carry. The skip carry adders are implemented as the ripple-carry ones. In addition, in order to avoid delays due to long carry propagations, the output carry of some slices are merged with some signals SPi,j which propagate the carry from Cj to Ci (i.e. SPij=Cj.Pj+1. Pj+2 ... Pi). The carry input Ci' of the slice i+1 is generated from the carry output Ci of the slice i as following Ci'=Ci v SPi,j. The signals Ci and Ci' compute the same function but Ci' is faster.

Figure 23:
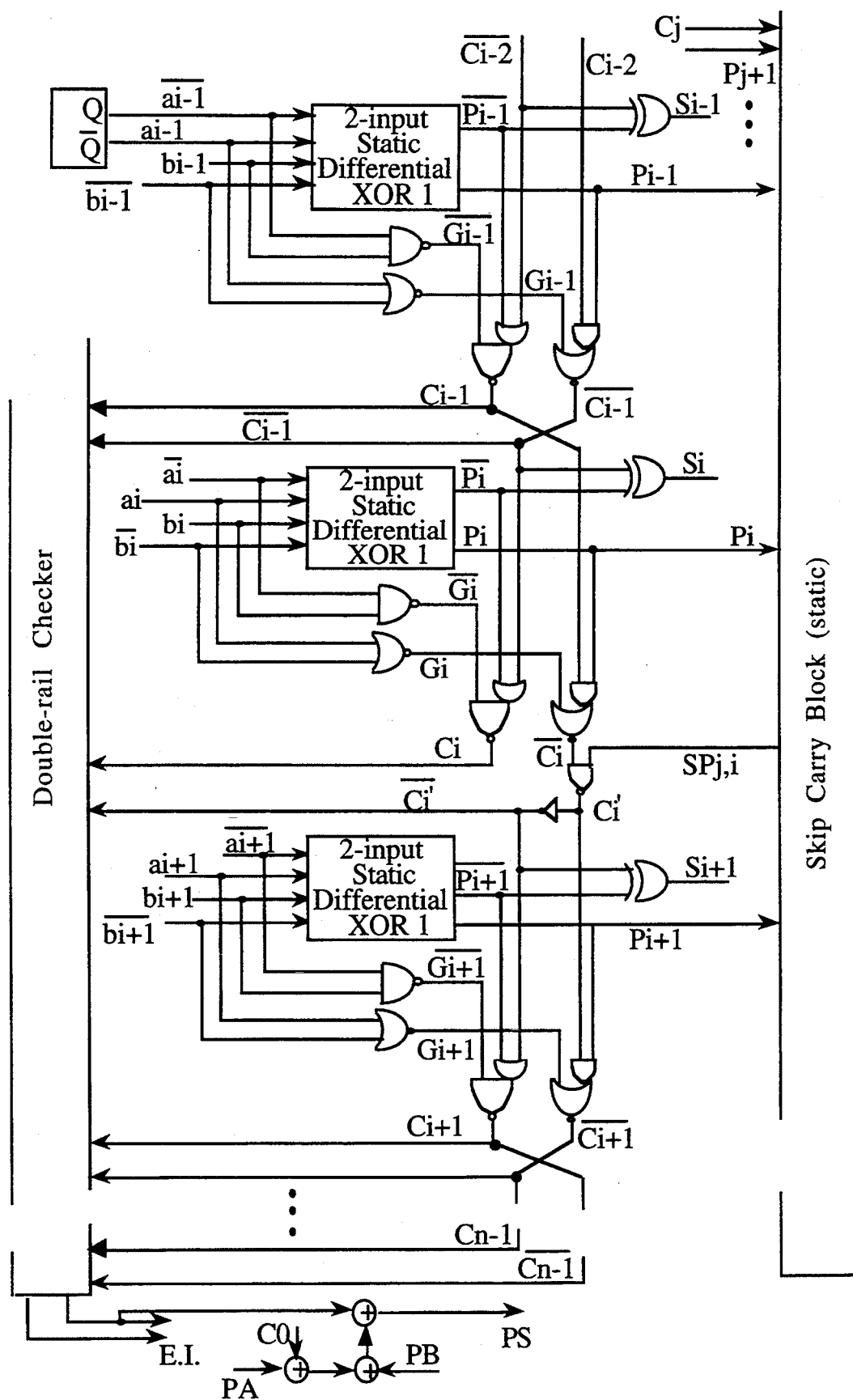
FIG. 23 is a circuit diagram illustrating the Carry Checking/Parity Prediction scheme for skip carry adders.

Note that checking directly the outputs of the skip carry block (i.e. the signals SPi,j) is not suitable for two reasons: At first this checking will require to generate a second set of signals SPi,j leading to the duplication of the skip carry block. At second the generation of a carry Ci' may involve more than one signal SPi,j. For instance we can have Ci'=Ci v SPi,j v SPi,r v ..., v SPi,s. Thus checking these signals may involve a much more greater double-rail checker than checking the carries. Thus instead of checking the outputs of the skip carry block, the signals Ci' will be checked. To do that the Carry Checking/Parity Prediction and the Carry and Output Checking/Parity Generation schemes are extended to the case of the skip carry adders/ALUs. The FIG. 23 illustrates (in static CMOS) the Carry Checking/Parity Prediction implementation for the case of skip carry adders. The fault secure property can be proven similarly to the case of carry lookahead adders proposed previously.

The Carry Checking/Parity Prediction and the Carry and Output Checking/Parity Generation implementations given previously for carry lookahead ALUs can be modified similarly to derive the implementations for the skip carry ALUs.

Conditional sum adders/ALUs

Another scheme allowing to speed up the carry propagation is the conditional sum scheme (see "HWANG K., Computer Arithmetic, Principles, Architecture and Design, John Wiley and Sons, New-York, 1979"). This scheme partitions the adder/ALU in several blocks. Each block is implemented using two carry chains. The carry input of the one chain is fixed to 0 and the carry input of the other one is fixed to 1. These chains generate respectively the signal $C_i^0$ and $C_i^1$. Thus each chain computes the carries without waiting the computation of its actual carry input value. When the computation of the carry input of the block is finished this carry is used to select the appropriate chain (by means of one MUX per slice).

Figure 24:
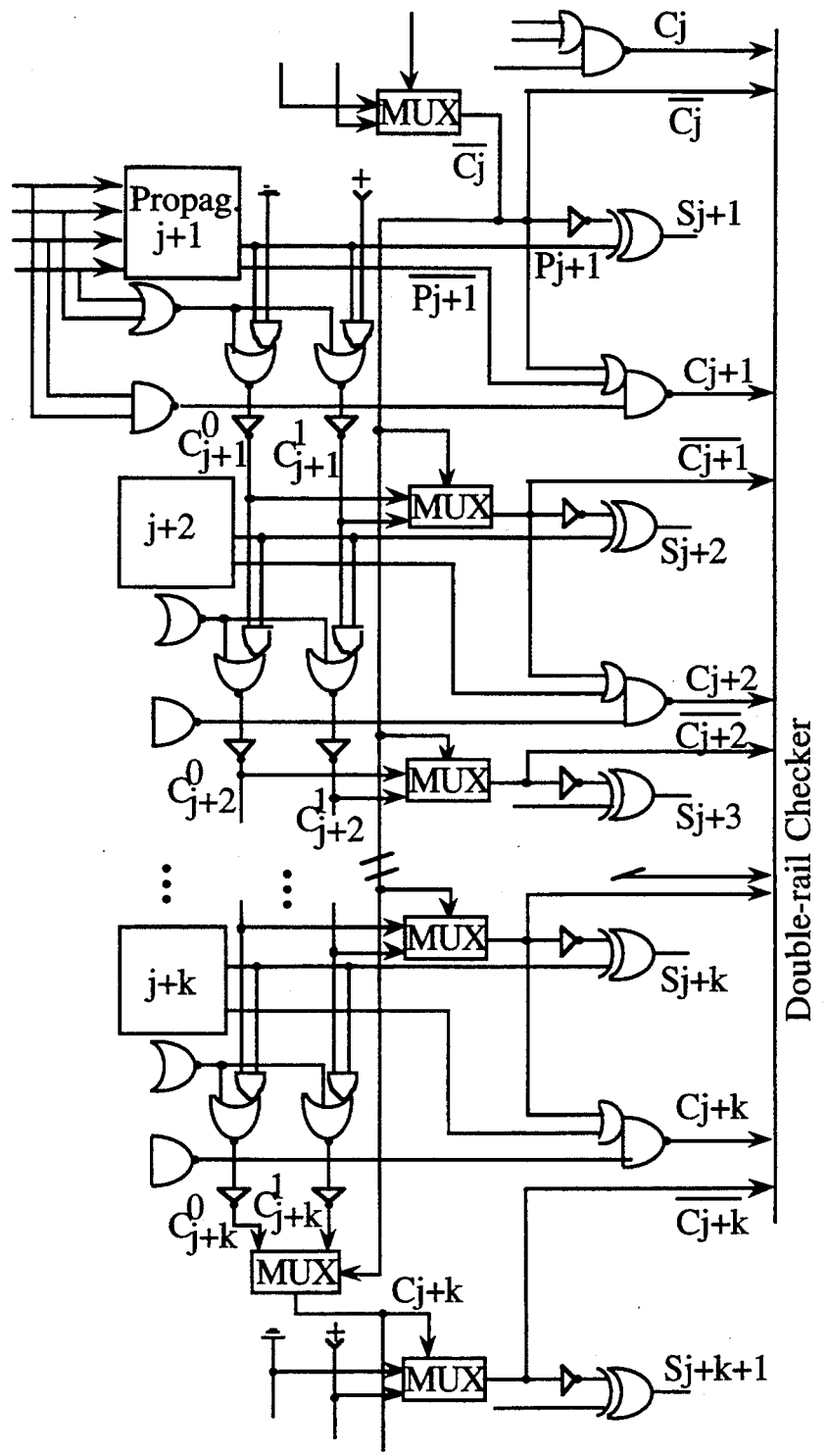
FIG. 24 is a circuit diagram illustrating a carry checking/parity predictor for a conditional sum adder.

The Carry Checking/Parity Prediction and the Carry and Output Checking/Parity Generation schemes can be easily extended to these adders/ALUs. The FIG. 24 illustrates the Carry Checking/Parity Prediction implementation for the case of the conditional sum adders. For checking purposes we have used a third carry chain (check chain). Each slice of this chain generates the input $C_i$ of the double-rail checker. The input $\overline{Ci-1}$ of the slice comes from the fast carries generated by the conditional sum adder. Thus the check carries are generated with the same delay as the outputs of the adder. The parity PS is generated as in FIG. 19. The fault secure property can be proven similarly to the schemes proposed previously.

The Carry Checking/Parity Prediction and the Carry and Output Checking/Parity Generation implementations given previously for carry lookahead ALUs can be modified similarly to derive the implementations for the conditional sum ALUs. The fault secure property can be proven similarly to the schemes proposed previously.

Carry Checking/Parity Prediction Scheme Using Existing Adder Layout.

The Carry Checking/Parity Prediction scheme can be adapted in order to be used with any existing adder design. This way, standard adders of cell libraries can be used and the design effort is minimized. This can be given as shown in FIG. 25. A redundant carry chain (named check carry chain) generates the check carries Ci. Each slice of this chain is implemented by using a complex gate (10 transistors in static CMOS). The input $Ci-1$ of each check carry slice comes from the adder itself. The carry output $Ci$ of each check carry slice is compared against the carry $Ci$ generated by the adder, as shown in FIG. 25. The parity bit PS is generated as in FIG. 19. This principle can be used with any adder implementation. However if the adder is a ripple-carry one, the check carry slice generating $Ci$ do not need to use as input the signal $Ci-1$ coming from the adder. This input can come from the previous slice of the check carry chain. The analysis of this scheme is similar to the scheme of the FIG. 19.

This technique can be extended to ALUs by using the parity prediction techniques described in the previous sections.

OUTPUT CHECKING/PARITY GENERATION FOR MULTIPLY AND DIVIDE ARRAYS

Several schemes of array multipliers and dividers have been proposed in the literature (see in "HWANG K., Computer Arithmetic, Principles, Architecture and Design, John Wiley and Sons, New-York, 1979"). The carry-propagate array multiplier consists on a n by n array of basic cells. The basic cell shown in FIG. 26.a is composed by an AND gate and a full adder. The carry-save array multiplier is composed by a n by n array of basic cells as the one of FIG. 26.a, and by a row of full adder cells which form a carry-propagate adder. The Pezaris array multiplier is one array composed by four types of cells. The cell of type 0 and 3 is a full adder (it generates the output $S=x\oplus y\oplus z$ and the carry $C=xy+xz+yz$), the specificity of the cells of type 3 is that its three inputs are inversed before feeding the full adder. The cell of type 1 and 2 are based on the functions $S=x\oplus y\oplus z$ and $C=xy+x\bar{z}+y\bar{z}$. One input variable of these functions is reversed for the cells of type 1 and two for the cells of type 2. The basic cell of the non-restoring array divider is composed by a full adder and an XOR gate as shown in FIG. 26b. In addition to these cells some extra XOR gates may be needed in order to improve controllability of some internal cells (see in "SHEN J. P., FERGUSON F. J., The Design of easily testable array multipliers, IEEE Transactions on Computers C-33 (6), pp. 559–560, Jun. 1984", and in "CHATTERJEE A., ABRAHAM J. A., Test generation for arithmetic units by graph labeling, 17th Fault Tolerant Computing Symposium, June 1987").

The implementation of the self-checking arrays can be given by using the differential full adders proposed previously. Since the signals P and G are not needed the design of FIG. 4.a (for DCVS implementation) or the one of FIG. 8 (for static CMOS), which require less area may be used. The XOR gate of FIG. 26.b and the extra XOR gates required for improving controllability will be implemented by using the scheme of FIG. 5.a (DCVS) or FIG. 6.a (static). The AND gate of FIG. 26.a will be replaced by an AND and an OR gates (Domino or static) which receive complementary inputs. Finally the inversion of some inputs of the full adder or of the input z of the carry gate, needed for the Pezaris array multiplier is obtained by swapping the direct and complementary lines of the input to be inverted using differential logic. Thus all the components for implementing any of the above arrays are available. Fault Secure Implementation: Since the Domino and
> DCVS gates are non inverting circuits, any array implemented using these gates verifies the rule R2. This ensures the fault secure property of the Domino/DCVS implementation for stuck-at, stuck-on and stuck-open faults. On the other hand the static differential full adder (FIG. 8) and the static differential XOR (FIG. 6.a) are inverting gates.

The use of non-inverting gates is not a necessary condition to verify the rule R2 or R3 (as it has been illustrated for the static ripple-carry adders based on the circuits of FIGS. 8 and 9). However in the case of array multipliers and dividers, there are several paths which connect an input to an output and which passes through different numbers of basic cells. Thus if the basic cells are inverting neither the rule R2 nor the rule R3 can be respected. Therefore to implement the static differential cells corresponding to the FIGS. 26.a and 26.b one inverter must be added on each of the outputs $Si$, $\overline{Si}$, $Ci$, $\overline{Ci}$ of the circuit of FIG. 8, and on the outputs of the NAND and NOR gates (for FIG. 26.a), or on the outputs of the 2-input static differential XOR (for FIG. 26.b). The resulting cell will have 56 transistors for the FIG. 26.a and 60 transistors for the FIG. 26.b. Another possibility is to use the static differential full adder of FIG. 9 as indicated in FIG. 27. One can easily verify that this circuit is non-inverting. Note that in FIG. 27 some of the variables a/\b, x, and z have been swapped, with respect to the FIG. 26.a. Since both the carry and the sum functions realized by the full adder are symmetric functions, this swapping will not modify the cell function.

A similar design can be used for the cell of FIG. 26.b. For this case the NAND and NOR gates of FIG. 27 are replaced by the differential static XOR of FIG. 6.a. The cell of FIG. 27 has 52 transistors and the cell corresponding to the FIG. 26.b has 56 transistors. With respect to the standard static implementation of these cells (34 and 38 transistors respectively), this corresponds to a transistor count overhead of 53% and 47% respectively. While the overhead in the case case of cells using the circuit of FIG. 8 require respectively an overhead of 65% and 58%. Thus the static implementation using the circuit of FIG. 9 result on an appreciable gain of 12% and 11% respectively.

The full adder row used in the carry-save array multipliers will be constructed by using the circuit of FIG. 9 in which one inverter is added to each of the $Ci-1$ and $\overline{Ci}-1$ inputs, so that we have again non-inverting circuits. Finally two inverters will be added to the differential XOR gates which are added for improving the controllability of some array cells (SHEN J. P., FERGUSON F. J., "The Design of easily testable array multipliers", IEEE Transactions on Computers C-33 (6), pp. 559–560, Jun. 1984). Thus all cells are non-inverting and the rule R2 is verified. This ensures the fault secure property for stuck-at and stuck-open faults, and also for stuck-on faults generating logic erroneous levels.

Finally the array will be checked by a double-rail checker. This checker generates also the parity of the outputs. However as the result of a multiplication has twice as many bits as the input operands, the result may be transferred to the BUSes in two phases (first the lower order half bits and their parity PL, and then the higher order half bits and their parity PH). To do that the double rail checker has to be implemented as in FIG. 28. Guidelines for showing the self-testing/SFS property. Exercising: Let consider a ripple carry adder. From literature on the C-testability of adders and ALUs, one can find tests allowing to exercise exhaustively each adder slice. Reporting these results to an adder using the slices of FIGS. 4a and 4b shows that these slices receive the exhaustive set of the double-rail input vectors. Then it is easy to see that each DCVS gate of these slices receive the exhaustive set of the double-rail input vectors. Also each of the two dual generate blocks of FIG. 4a (composed by standard gates) is tested exhaustively. Similar results are valid for the other ripple carry adder schemes proposed by the present invention. This can also be shown for the schemes of the ripple carry ALUs, by considering the exhaustive testing of the slices of a ripple carry ALU (such test can been derived easily e.g. see in "NICOLAIDIS M., Test pattern for arithmetic units and arithmetic and units, 1991 European Test Conference (ETC), Munich, Apr. 10-12, 1991"). Such results can also been obtained for the DCVS gates and for the standard gates of the multiply and divide arrays by considering for instance the test derived in "CHATTERJEE A., ABRAHAM J. A., Test generation for arithmetic units by graph labeling, 17th Fault Tolerant Computing Symposium, June 1987". Finally tests allowing to detect the multiple stuck-at faults and the single stuck-open faults in any skip carry and any carry lookahead circuit are derived in (NICOLAIDIS M., "Test pattern for arithmetic units and arithmetic and units", 1991 European Test Conference (ETC), Munich, Apr. 10-12, 1991).

Error Propagation for adders/ALUs: Let consider the Output Checking/Parity Generation scheme.

a) From "BARZILAI et ad., Accurate Fault modeling and efficient simulation of differential CVS circuits, in Proc. IEEE Int. Test Conf. 1985, pp. 722-729", and from "KANOPOULOS N., VASANTHAVADA N., Testing of Differential Cascade Voltage Switch (DCVS) Circuits, IEEE Journal of Solid-state Circuits, Vol. 25, No 3, June 1990", under a fault, a DCVS gate gives erroneous outputs only of the type 00 or 11.

b) From the rule R2 a static differential gate gives erroneous outputs only of the type 00 or 11. This holds also for the propagate blocks (two-output non differential gates) of FIGS. 20a and 20b. Also the dual generate blocks give errors of this type.

The above errors occur to the signals Pi, $\overline{Pi}$, or to the signals Ci, $\overline{Ci}$ or to the signals Si, $\overline{Si}$ (these last are observable). Both the signals Pi, $\overline{Pi}$, and Ci, $\overline{Ci}$ are inputs to a DCVS XOR gate, or to a static differential XOR gate which generate the outputs Si, $\overline{Si}$. The DCVS XOR is code disjoint with respect to the double-rail code (see JHA N. K. "Fault detection in CVS parity trees: application to SSC CVS parity and two-rail checkers". The 19th Int. Symp. on Fault Tolerant Computing, Chicago, U.S.A., Jun. 21—23 1989, Digest of papers of FTCS-19). Thus the above errors are propagated to the outputs Si, $\overline{Si}$. This is not the case of the static differential XOR gate. It can be shown that any non-double-rail input vector is transposed to a non double-rail output vector, excepting the case when both the non double-rail values 00 and 11 are applied to two input pairs of such a gate. In this case the outputs are on the high impedance state and preserve their previous values (which can be double-rail). However one can see easily that a single fault can never produce errors on both the signals Pi, $\overline{Si}$, and Ci, $\overline{Si}$. Thus again the errors are propagated to Si, $\overline{Si}$.

In the cases of the Carry and Output Checking/Parity Generation scheme and of the Carry Checking/Parity Prediction scheme a better observability is present than in the case of the Output Checking/Parity Generation scheme (both the carries and the outputs are observable). Thus the error propagation to the observable points is ensured again. Q.E.D Error propagation for multiply and divide arrays: We have seen that under a fault the basic cell used in the self-checking arrays produces unidirectional outputs errors (i.e. only 00 or only 11 erroneous outputs). These errors will be applied to the inputs x, $\overline{x}$, y, $\overline{y}$ of two other cells. If these errors are always propagate by the new cells they will reach the array outputs. Note that the output S of each cell is $S = x \oplus y \oplus z$ (where $\oplus$ means the differential XOR):

the DCVS 2-input and 3-input XOR gates are code-disjoint with respect to the double-rail code. Thus the above errors are always propagated.

the static differential 2-input and 3-input XOR gates are not code-disjoint. However if only one input pair is erroneous, or if the values of both the erroneous input pairs are the same (i.e. both 00 or both 11), the output values will not be double-rail and the error is propagated. Since all the cells of the array are non-inverting, then, the errors generated by the faulty cell will be propagated at the inputs of any other cell to errors of only the type 00 or of only the type 11. Thus the condition for the error propagation through the static differential XORs holds and the above mentioned errors are always propagated. Q.E.D The above results will be completed by showing that the proposed circuits do not include redundant stuck-at, stuck-on or stuck-open faults. The following definitions will be used to clarify the approach we have used.

Definition D1: A line of a circuit is non-redundant with respect to a set V of input vectors, if: removing the line and replacing it by a VDD or by a Vss line will modify the circuit (gate) output for at least a vector of the set V. In any other case the line is redundant with respect to V.

A circuit which has redundant lines can be simplified by using the R-transformation (McCLUSKEY E. J., CLEGG F. W. "Fault equivalence in combinational logic networks", IEEE Trans. Comp., Vol. C-20, pp. 1286-1293, Nov. 1971), some lines and perhaps some gates can be removed, the resulting circuit does not include redundant stuck-at faults. As explained below, in the DCVS and in the differential static gates used in this invention, there are not lines redundant with respect to the exhaustive set of double-rail input vectors. Thus there are not redundant stuck-at faults.

Definition D2: In a transistor network connecting two nodes A and B, a transistor is non-redundant with respect to a set of input vectors V, if:

a) removing the transistor and replacing it by a wire, leads the network to the conducting state for at least one vector of V for which the network must be on the non-conducting state.

b) removing the transistor and letting its Drain and source terminals disconnected, leads the network to the non-conducting state for at least one vector of V for which the network must be on the conducting state.

In any other case the transistor is redundant with respect to V. Obviously a network which has some redundant transistors can be simplified to a non-redundant one by removing the redundant transistors. If the n and p transistor networks of a gate are not redundant, the gate does not include redundant stuck-on and stuck-open faults.

The following types of networks have been used by the present invention:

DCVS XOR gates, DCVS carry gates, generate blocks based on standard gates, carry lookahead blocks based on standard gates. All these networks are well known and well studied networks and they do not include redundancies.

Some new two-output gates (differential and non differential) used to implement the propagate block for ALUs. By removing each transistor according the cases a) and b) of definition D2, the transistor networks of these gates do not include redundancies. Line redundancies are also verified easily.

By the above results for both the domino/DCVS and the static implementations of the proposed circuits, and for each stuck-at, stuck-on and stuck-open fault, there is a vector which sensibilizes and propagates the fault. Thus all the stuck-at faults are detectable in both the domino/DCVS and the static implementations.

In the DCVS/Domino implementations we consider that the gates have been made p-dominant as suggested in "JHA N. K., Strongly fault-secure and strongly self-checking domino-CMOS implementations of totally self-checking circuits, IEEE Transactions on CAD-/ICAS, Vol. 9, No 3, March 1990". From the above results, from the fact that the circuits have been shown to be fault secure and from the results obtained above, these implementations are strongly fault secure.

In the static CMOS implementations all the stuck-on faults are detectable by means of current monitoring. On the other hand for each stuck-open fault there is a vector which initializes the gate output to the required value 0 or 1 (since the stuck-at faults are detectable). Since there are not ordering restrictions for the vectors applied to the circuit, the stuck-open faults are detectable. This way the static implementation of the present invention will be self-testing.

Current monitoring can be integrated in the system by using Built-In Current Sensors (BICS) (NIGH P., MALY W. "A Self-Testing ALU Using Built-In Current Sensing", in Proc. of 1989 Custom Integrated Circuits Conference). A block can be monitored periodically by a BICS during an off-line test phase in order to detect stuck-on faults. During the on-line operation the BICS is isolated and the block connected to Vss through an nMOS.

Fault Secure property for undetermined erroneous levels.

Ensuring the fault secure property, by means of logic monitoring, for faults involving undetermined levels (like the stuck-on faults in static CMOS) is important for the following reasons:

A circuit can be made fault secure for the stuck-on faults by implemented it in Domino logic (see JHA N. K., "Strongly fault-secure and strongly self-checking domino-CMOS implementations of totally self-checking circuits," IEEE Transactions on CAD/ICAS, Vol. 9, No 3, March 1990). However Domino circuits are very sensible to the noise and they are not suitable for many safety critical applications. Also due to their sensibility to the radiation they are prohibited in space applications (KERNS S. E., SHAFER B. D., ed., "The design of Radiation-Hardened ICs for space: a compendium of approaches" Proc. IEEE, pp. 1470-1509, November 1988). From the safety point of view, implementing a static CMOS which is fault secure (but not self-testing for stuck-on faults) can be better than implementing an SFS Domino circuit.

Static CMOS circuits can be made fault secure for stuck-on faults by using a BICS for on-line current monitoring. The first BICS had a very hight evaluation time (e.g. "NIGH P., MALY W. A Self-Testing ALU Using Built-In Current Sensing, in Proc. of 1989 Custom Integrated Circuits Conference"), so that they can not be used for on-line current monitoring. Recently, a fast BICS design proposed in (SHEN T., "On-Chip Current Sensor for CMOS Self-Testing Integrated Circuits", Master Thesis, University of Rhode Island, Kingston, 1991), has been fabricated through MOSIS 2 $\mu$m p-well CMOS. The actual detecting time of this BICS is less than 2 ns. Thus there is a reasonable hope that BICS should be used for on-line current monitoring. A drawback of this technique is that it introduces a speed degradation since the circuit is not connected directly to the Vss. This degradation may not be critical in many applications.

In both Domino and static CMOS, some real faults can generate undetermined erroneous levels without involving static current dissipation. For instance the stuck-open fault model considers that the stuck-open transistor has always an infinite resistance. However a real fault can increase the transistor resistance from R to Rf ($R < Rf < < \infty$). In such a case the faulty transistor will supply a current lower than the normal one. Then, the fall or the rising time of the faulty gate will be increased. Obviously this situation can involve undetermined levels without involving static current dissipation. Current monitoring can not detect such faults. Thus ensuring the fault secure property for such faults improves significantly the safety.

For single faults producing undetermined erroneous levels (NICOLAIDIS M., COURTOIS B. "Design of self-checking circuits using unidirectional error detecting codes". Proc. 16th Fault Tolerant Computing Symposium, Vienna, Austria, July 1986, pp. 22-27) uses some analysis on the electrical level and shows that even if the output errors have undetermined levels they remain unidirectional (i.e. only of the type 0→I or only of the type 1→I at each time, with I being 0, 1, or undetermined). The same fact is shown in (NANYA T., GOOSEN H. A., "Effect of Byzantine hardware faults on concurrent error checking". In Proc. ICCAD, pp. 242-245, Nov. 1987) by using an analysis on a more abstract level. However, as pointed out in (NICOLAIDIS M., COURTOIS B. "Layout rules for the design of self-checking circuits". VLSI Conference, August 85, Tokyo, Japan, pp. 261-272) and in (NICOLAIDIS M., COURTOIS B. "Design of self-checking circuits using unidirectional error detecting codes". Proc. 16th Fault Tolerant Computing Symposium, Vienna, Austria, July 1986, pp. 22-27), a last problem may occur in this case. Suppose that the outputs having the undetermined levels are checked by a checker and they also feed a functional block. Then the checker can interpret the undetermined levels as the correct ones while the functional block can interpret some of these levels as the erroneous ones. In this case the system has lost the fault secure property. The technique allowing to circumvent this problem will be based on the following assumption:

Assumption 1: After propagation through two or more static CMOS gates an undetermined level is transformed to a logic one.

This assumption is realistic since the static CMOS gates are very efficient restoring elements. It is well known that an undetermined level is generally restored to a logic one after propagation through few gate levels. This assumption will guarantee that faults affecting some internal gates will always give logic output errors. However this is not true for every fault (consider for instance a stuck-on fault occurring on a gate generating a primary output).

Below the fault secure property for the Output Checking/Parity Generation scheme is shown (FIG. 1a). If the above assumption is used to analyze the impact of a single fault in this scheme we find that there are two possible cases:

a—only one output pair is erroneous. This pair can have undetermined values or logic values.

b—several output pairs (e.g. (Si, $\overline{Si}$), (Si+1, Si+1), ..., (Si+j, Si+j)) are erroneous, but only one pair (i.e. the pair (Si, $\overline{Si}$)), can have undetermined values.

In the cases a) if the double-rail checker (FIG. 1a) interprets the undetermined level as an erroneous one the fault is detected. If the ALU output latches interpret this level as the correct one, then, there is no problem. Thus it remains the case that the checker interprets this level as correct and the ALU output latches as erroneous. In this case the double-rail checker generates the correct parity of the adder/ALU outputs, while one bit of the adder/ALU output latches is erroneous. Then the parity checker of the BUS (FIG. 1a) detects the error. In the case b) since there are some erroneous outputs on the logical level the double-rail checker will detect the error. So both cases are covered. Thus the fault secure property for stuck-on faults is ensured with a reasonable degree of confidence. The error classification to the case a) and b) is based on the fact that in case of multiple erroneous output pairs (Si, $\overline{Si}$), (Si+1, Si+1), . . . , only the pair (Si, $\overline{Si}$) can have undetermined values. For the other pairs the errors are propagated through at least two gate levels, and from assumption 1 they will be restored. For an even more efficient restoration the designer can add one or two inverters to each output of the circuit.

Figure 1C:
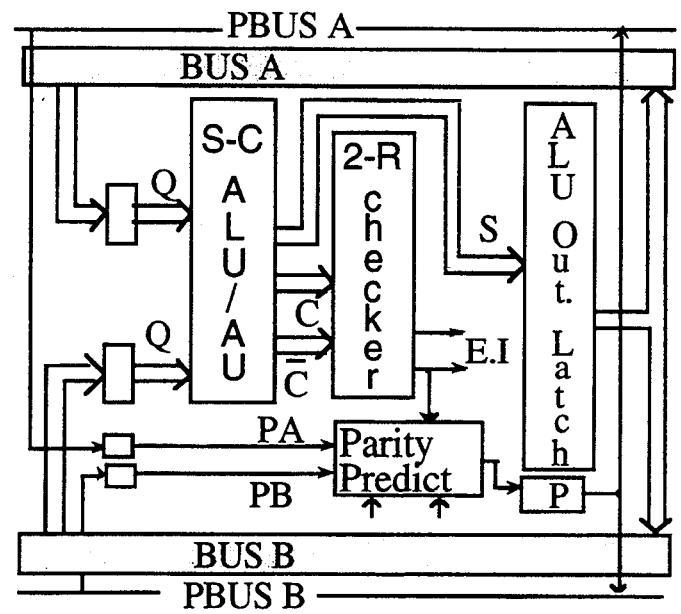

The detection of these errors is due to the fact that a single block has been used for both double-rail checking and parity generation. The multipliers and dividers implemented according the FIG. 1a are also based on the above principle and the fault secureness holds. The carry double-rail checker of the scheme of FIG. 1c is also based on these principle. A similar analysis as above allows to show the fault secure property for faults generating undetermined levels on the carries. For errors affecting the outputs but not the carries (single output errors), the fault secure property is shown using the arguments given below for the faults affecting the adder/ALU output latches. The carry double-rail checker of the scheme of FIG. 1b does not follows the above principle and the fault secureness is lost for some stuck-on faults.

Let us now consider the other functional blocks of the data path:

i) A fault affecting the adder/ALU output latches. A single fault affecting the adder/ALU output latches can produce a single error. If the error is on an undetermined level it may not be detected by the parity checker of the BUS. The data will be transferred to some other block.

If the data is transferred to the register file, the error will be restored to either the correct or to the erroneous value (a register is a very efficient restoring element). The possible error will remain single. Thus if the register is read again the error will be detected by the BUS parity checker.

If the data is transferred to the shifter, the possible error is detected by the parity checker of the shifter, for similar reasons.

If the data is transferred to the adder/ALU input latches, then one can checks that for the Carry Checking/Parity Prediction scheme (FIG. 1c) the fault secureness holds. For the other two schemes (FIG. 1a and FIG. 1b) the fault secureness is lost.

ii) A fault affecting the register file. A similar analysis shows that the fault secureness holds for the Carry Checking/Parity Prediction scheme. iii) A fault affecting the shifter: An undetermined level generated by a faulty cell ci of the shifter may not to be detected by the shifter parity checker and to be propagated to the cell ci+1. In that case the shifter can generate a double error and the fault secureness is lost. This situation will be avoided if on uses two parity bits to check the shifter (one for the even bit positions and the other for the odd ones), allowing to detect the two-adjacent bit errors. This way the fault secureness is ensured. Of course in order to be compatible with this coding, the other blocks of the data path will also be implemented by using two parity bits.

I claim:

1. A data processing system wherein data are parity encoded for failure checking, including a logic operator generating predetermined signals responsive to input signals via first signal paths including results and carry signals;

means for generating complements of the predetermined signals responsive to the input signals received through second signal paths which are distinct from the first signal paths;

a double-rail checker receiving said predetermined signals from the logic operator and said compliments from said generating means and for checking said logic operator responsive to said predetermined signals and said compliments and producing an output bit; and a parity predictor for predicting and generating a parity bit of the results of the logic operator responsive to the output bit of said double-rail checker.

2. A data processing system according to claim 1, wherein said predetermined signals are the results of the logic operator, and the parity predictor directly providing said output bit of the double-rail checker as said parity bit.

3. A data processing system according to claim 1, wherein said predetermined signals are the carry signals, and the parity predictor generates said parity bit as a function of at least one of the output bit and the parity of the input signals.

4. A data processing system according to claim 3, wherein the logic operator is a carry lookahead operator including a carry lookahead circuit, said carry lookahead circuit generating the carry signals including previous and next carry signals, and wherein compliments of the carry signals including previous and next compliment carry signals are generated, the next compliment carry signal being generated responsive to the previous carry signal.

5. A data processing system according to claim 3,
wherein the carry signals include previous and next carry signals, wherein the input signals include previous and next input signals, and wherein compliments of the carry signals including previous and next compliment carry signals are generated, the next compliment carry signal being generated responsive to the previous carry signal and the next input signals.

6. A data processing system according to claim 3, wherein the logic operator comprises two ripple carry chains of elementary carry computation circuits, respectively providing the carry signals and the complements of the carry signals.

7. A data processing system according to claim 3, wherein the logic operator is an adder and the parity predictor provides a parity bit equal to $$C_O(+)PA(+)PB(+)PR,$$

wherein $C_O$ is a carry input of the logic operator, PA and PB are respective parity bits of operands A and B, PR is the output bit, and (+) is the bitwise XOR operation.

8. A data processing system according to claim 1, wherein the logic operator comprises logic gates whose inputs and outputs are double-rail encoded.

9. A data processing system according to claim 8, wherein the logic operator comprises differential logic gates.

10. A data processing system according to claim 9, wherein the differential logic gates are static gates.

11. A data processing system according to claim 1,
wherein said logic operator performs arithmetic and logic operations,
wherein said predetermined signals are the carry signals,
wherein said logic operator generates the carry signals responsive to the arithmetic and logic operations performed by said logic operator, and
wherein the parity predictor generates said parity bit as a function of the output bit, the parity of the input signals and the arithmetic and logic operations performed by said logic operator.

* * * * *